(12) United States Patent
Kwon et al.

(10) Patent No.: US 7,950,823 B2
(45) Date of Patent: May 31, 2011

(54) LAMP FIXING UNIT, BACKLIGHT ASSEMBLY HAVING THE SAME AND DISPLAY DEVICE HAVING THE SAME

(75) Inventors: Yoon-Soo Kwon, Anyang-si (KR); Jung-Tae Kang, Suwon-si (KR); Jin-Ho Ha, Suwon-si (KR); Joo-Yeong Won, Seoul (KR); Yong-Seok Yang, Asan-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 12/616,090

(22) Filed: Nov. 10, 2009

(65) Prior Publication Data
US 2010/0048060 A1      Feb. 25, 2010

Related U.S. Application Data

(62) Division of application No. 11/752,095, filed on May 22, 2007, now Pat. No. 7,637,625.

(30) Foreign Application Priority Data

May 23, 2006  (KR) .................... 2006-45972
Jun. 1, 2006   (KR) .................... 10-2006-049222

(51) Int. Cl.
    *F21V 23/00* (2006.01)
(52) U.S. Cl. ................................ 362/225; 362/260

(58) Field of Classification Search .............. 362/97.2, 362/225, 217.12, 217.13, 217.16, 217.17, 362/260, 631, 634, 646; 439/226, 239
See application file for complete search history.

(56) References Cited

U.S. PATENT DOCUMENTS

| 3,176,260 | A | * | 3/1965 | Pascucci ............. 362/217.16 |
| 4,198,109 | A | * | 4/1980 | Ustin ..................... 439/239 |
| 4,435,744 | A | | 3/1984 | Russo |
| 5,720,546 | A | | 2/1998 | Correll, Jr. et al. |
| 7,325,941 | B2 | | 2/2008 | Kim et al. |
| 7,549,880 | B2 | * | 6/2009 | Miyazono et al. ......... 439/232 |
| 2005/0226002 | A1 | | 10/2005 | Aoki et al. |
| 2005/0276074 | A1 | | 12/2005 | Ryu |

FOREIGN PATENT DOCUMENTS

| JP | 2000-149648 | 5/2000 |
| JP | 2005-158585 | 6/2005 |
| KR | 1020040057712 A | 7/2004 |

* cited by examiner

Primary Examiner — Y My Quach Lee
(74) Attorney, Agent, or Firm — Innovation Counsel LLP

(57) ABSTRACT

A lamp fixing unit capable of simplifying the manufacture of a backlight assembly by eliminating the need for manual procedures is presented. The lamp fixing unit includes a fixing member and a lamp holder. The fixing member includes a fixing body and at least one receiving portion. The lamp holder includes a holder body and a conductive socket. The holder body includes a board insertion portion, a power supply member, and a lamp fixing member. Thus, the power supply member may be easily coupled to and uncoupled from the lamp holder, and the lamp may be easily grounded.

7 Claims, 21 Drawing Sheets

LAMP FIXING UNIT, BACKLIGHT ASSEMBLY HAVING THE SAME AND DISPLAY DEVICE HAVING THE SAME

CROSS-REFERENCE TO RELATED APPLICATIONS

This application is a divisional of U.S. patent application Ser. No. 11/752,095 filed May 22, 2007, which claims priority upon Korean Patent Application No. 2006-45972 filed on May 23, 2006 and Korean Patent Application No. 2006-49222 filed on Jun. 1, 2006, the contents of which are herein incorporated by reference in their entireties.

BACKGROUND OF THE INVENTION

1. Field of the Invention

The present invention relates to a lamp fixing unit, a backlight assembly having the lamp fixing unit and a liquid crystal display device having the lamp fixing unit. More particularly, the present invention relates to a lamp fixing unit capable of easily coupling and uncoupling a lamp holder and a power supply member, and easily grounding a lamp, a backlight assembly having the lamp fixing unit and a liquid crystal display device having the lamp fixing unit.

2. Description of the Related Art

Generally, a liquid crystal display (LCD) device includes an LCD panel displaying an image and a backlight assembly providing light to the LCD panel.

A backlight assembly employed in a large LCD device typically includes a receiving container, a plurality of lamps disposed substantially parallel to each other and each having a power lead at a first end and a ground lead at a second end, a plurality of lamp holders each fixing an end portion of each lamp and applying a power source to the power lead, and a power supply board electrically connected to the lamp holders and supplying the power source to the lamp holders.

Each of the lamp holders is electrically connected to the power supply board through a power source line. Particularly, the power source line is soldered with the lamp holders and the power supply board.

When a defective lamp holder and/or a defective power supply board is replaced with a new lamp holder and/or a new defective power supply board, the soldering has to be removed.

Also, the backlight assembly includes a separate ground line for connecting the ground lead to the receiving container. A first end of the ground line is soldered with the ground lead, and a second end of the ground line is coupled to the receiving container using a bolt, to thereby ground the ground lead through the receiving container. Such grounding process is performed manually by soldering and bolt-coupling.

The above-mentioned manual procedures make both the manufacturing process and the repair of the backlight assembly troublesome.

SUMMARY OF THE INVENTION

The present invention obviates the above problems and thus, the present invention provides a lamp fixing unit capable of easily coupling and uncoupling a lamp holder and a power supply member, and easily grounding a lamp.

The present invention also provides a backlight assembly having the above-mentioned lamp fixing unit.

The present invention also provides a liquid crystal display device having the above-mentioned lamp fixing unit.

In one aspect, the present invention is a lamp fixing unit that includes a fixing member and a lamp holder. The fixing member includes a fixing body and at least one receiving portion protruding from the fixing body in a first direction. A first opening is formed at a side of the receiving portion. The lamp holder includes a holder body and a conductive socket. The holder body includes a board insertion portion that is received in the receiving portion and has a second opening, a power supply member inserted through the first opening of the receiving portion and the second opening, and a lamp fixing member that protrudes in a second direction from the fixing body and fixes a lamp. The second direction is opposite the first direction. The conductive socket is disposed in the holder body to electrically connect the power supply member and the lamp to each other.

In another aspect, the present invention is a backlight assembly that includes a receiving container, a plurality of lamps, a first lamp fixing unit, a second lamp fixing unit and a power supply member. The lamps are received in the receiving container and arranged substantially parallel to each other. Each lamp has a power source lead formed at a first end portion and a ground lead formed at a second end portion. The first lamp fixing unit is disposed to support the power source lead. The first lamp fixing unit includes a fixing member and a first lamp holder that is received in the fixing member to fix the lamp and has a first conductive socket in the first lamp holder. The second lamp fixing unit includes an array plate coupled to the receiving container and electrically connected to the ground lead, and a plurality of second lamp holders arranged on and fixed to the array plate. Each second lamp holder includes an insulation body and a second conductive socket inserted into the insulation body to electrically connect the ground lead to the array plate. The power supply member is disposed on a rear surface of the receiving container. The power supply member is inserted into and fixed to the first lamp fixing unit to be electrically connected to the power source lead through the first conductive socket.

In still another aspect, the present invention is a liquid crystal display (LCD) device that includes a backlight assembly, an LCD panel, and a top chassis. The backlight assembly generates light. The LCD panel is disposed over the backlight assembly to display an image by using the light. The top chassis fixes an edge portion of the LCD panel and is coupled to the backlight assembly. The backlight assembly includes a receiving container, a plurality of lamps, a first lamp fixing unit, a second lamp fixing unit and a power supply member. The receiving container is coupled to the top chassis. The lamps are received in the receiving container and arranged substantially parallel to each other. Each lamp has a power source lead formed at a first end portion and a ground lead formed at a second end portion. The first lamp fixing unit is disposed to support the power source lead. The first lamp fixing unit includes a fixing member and a first lamp holder that is received in the fixing member to fix the lamp and has a first conductive socket in the first lamp holder. The second lamp fixing unit includes an array plate coupled to the receiving container and electrically connected to the ground lead, and a plurality of second lamp holders arranged on and fixed to the array plate. Each second lamp holder includes an insulation body and a second conductive socket inserted into the insulation body to electrically connect the ground lead to the array plate. The power supply member is disposed on a rear surface of the receiving container. The power supply member is inserted into and fixed to the first lamp fixing unit to be electrically connected to the power source lead through the first conductive socket.

According to the above, the power supply terminals of the power supply member are electrically connected to the first connection portion through the first and second openings, so that the power supply member is easily coupled to and uncoupled from the lamp holders. Also, the array plate including metal is coupled to the receiving container, and the ground lead and the array plate are electrically connected through the conductive socket of the first lamp holders, thereby easily coupling the ground lead to the receiving container (i.e., grounding the ground lead).

BRIEF DESCRIPTION OF THE DRAWINGS

The above and other features and advantage points of the present invention will become more apparent through descriptions in detailed exemplary embodiments with reference to the accompanying drawings, in which.

DESCRIPTION OF THE EMBODIMENTS

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. It will be understood that when an element is referred to as being "on" or "onto" another element, it may be directly on the other element or intervening elements may also be present.

Figure 1:
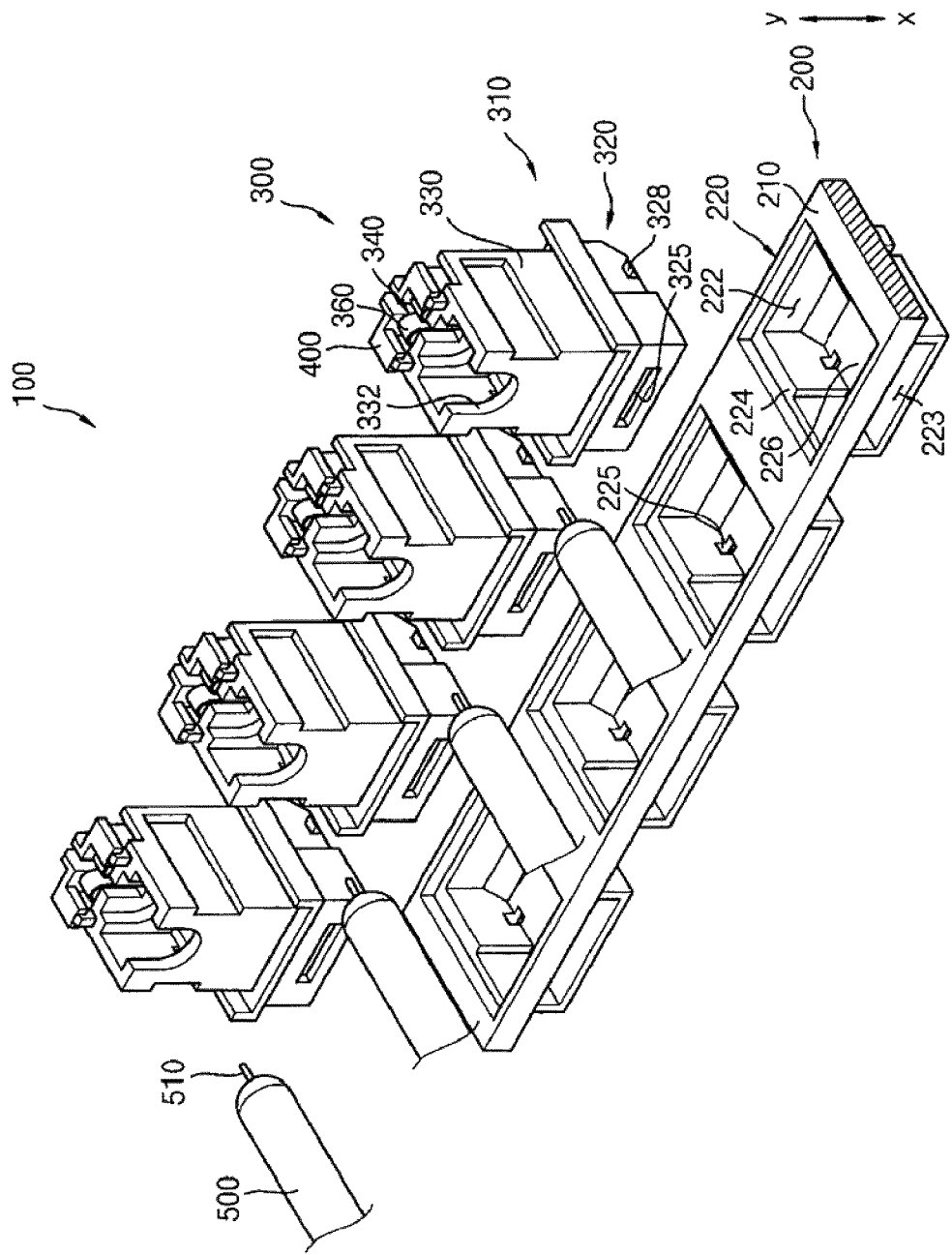
FIG. 1 is an exploded perspective view illustrating a lamp fixing unit according to an exemplary embodiment of the present invention.
Figure 2:
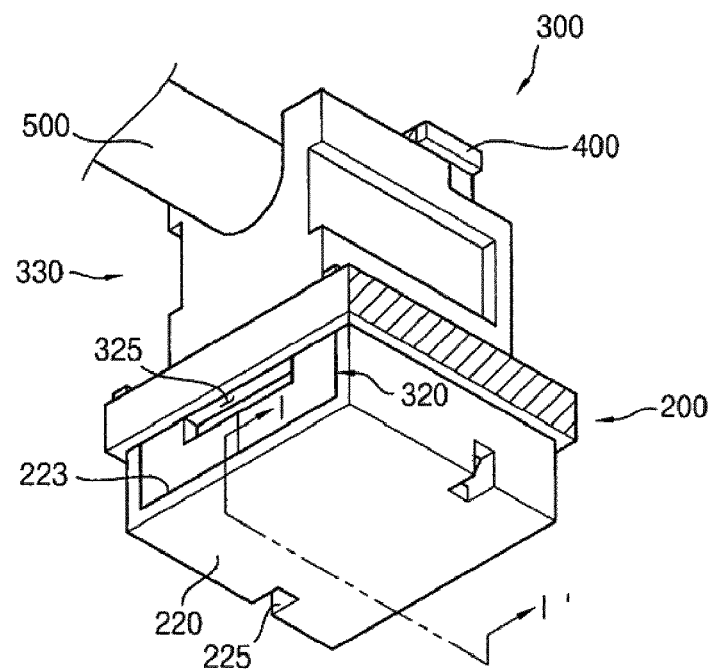
FIG. 2 is a rear perspective view illustrating the lamp-fixing unit illustrated in FIG. 1.
Figure 3:
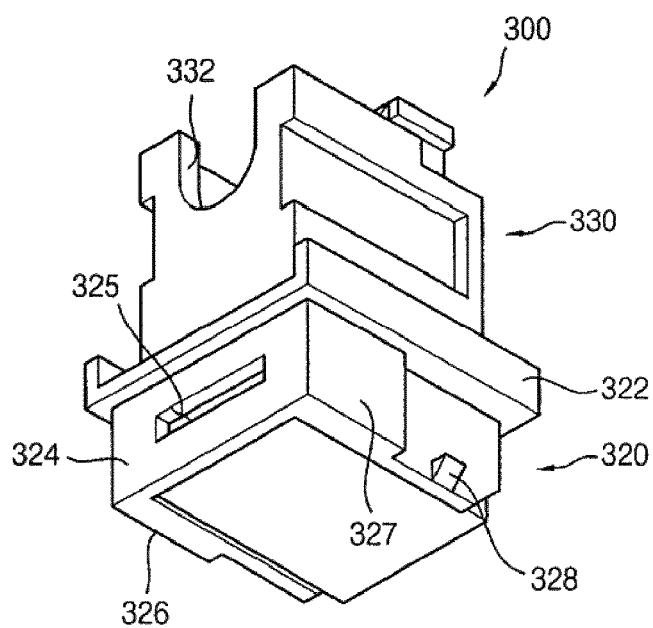
FIG. 3 is a perspective view illustrating the lamp holder illustrated in FIG. 2.

FIG. 1 is an exploded perspective view illustrating a lamp fixing unit according to an exemplary embodiment of the present invention. FIG. 2 is a rear perspective view illustrating the lamp-fixing unit illustrated in FIG. 1. FIG. 3 is a perspective view illustrating the lamp holder illustrated in FIG. 2.

Referring to FIGS. 1 to 3, a lamp fixing unit 100 according to an exemplary embodiment of the present invention includes a fixing member 200 and a plurality of lamp holders 300.

The fixing member 200 includes a fixing body 210 and at least one receiving portion 220. The receiving portion 220 protrudes from the fixing body 210 in a first direction 'x' substantially perpendicular to the fixing body 210, and is open in a second direction 'y' that is opposite to the first direction 'x', thereby forming a receiving space 222.

In an exemplary embodiment, a plurality of receiving portions 220 is spaced at regular intervals along a longitudinal direction of the fixing body 210. The fixing member 200 includes, for example, a resin material having good insulating characteristics and processing characteristics.

Each of the lamp holders 300 includes a holder body 310 and a conductive socket 340 inserted into the holder body 310. The holder body 310 may define a shape of each lamp holder 300. For example, each lamp holder 300 has a quadrangular cylindrical shape.

The holder body 310 may include a resin material having good insulating characteristics, and the conductive socket 340 may include metal having good electrical conductivity, so that a driving voltage may be applied to a lead 510 formed on an end portion of a lamp 500 from a power supply member that is externally provided. Thus, the holder body 310 encloses and electrically protects the conductive socket 340.

The holder body 310 includes a board insertion portion 320 and a lamp fixing portion 330. The board insertion portion 320 is received in the receiving portion 220. The lamp fixing portion 330 protrudes in the second direction 'y' from the fixing body 210 and fixes the lamp 500. For example, when the lamp fixing portion 330 is formed on or over the holder body 310, the board insertion portion 320 is formed beneath or under the holder body 310.

Thus, the board insertion portion 320 of the lamp holder 300 is received in the receiving space 222 of the receiving portion 220, and the lamp holders 300 may be arranged at substantially the same intervals.

The lamp fixing portion 330 has a fixing groove 332 that is rounded to hold the lamp 500 having a cylindrical shape. Since the weak glass tube of the lamp 500 is placed on the fixing groove 332, a shock-absorbent material may be coated on the fixing groove 332 to prevent damage to the lamp 500.

The fixing member 200 has a first opening 223 exposing the receiving space 222 to a side of the receiving portion 220. A plurality of first openings 223 is formed at the same side of the receiving portion 220. A second opening 325 is formed on a side of the board insertion portion 320 in the same direction as the first opening 223. Thus, an insertion space, which is formed when the board insertion portion 320 is received in the receiving portion 220, may be exposed.

The second opening 325 has an area that is smaller than or equal to that of the first opening 223. Thus, a power supply terminal of a power supply member (refer to FIGS. 10 to 12) may be inserted into the second opening 325, not affected by the first opening 223 formed outside the second opening 325. in some embodiments, the second opening 325 may have an area that is greater than that of the first opening 223 for reasons such as the size of a product, convenience, etc.

The board insertion portion 320 includes a coupling portion 322, a first sidewall 324, a second sidewall 326 and a third sidewall 327. The coupling portion 322 is coupled to a lower portion of the lamp fixing portion 330. The first sidewall 324 protrudes from the coupling portion 322 in the first direction 'x' and has the second opening 325. The second sidewall 326 protrudes from a first end of the first sidewall 324 in a substantially perpendicular direction, and is connected to the coupling portion 322. The third sidewall 327 is substantially parallel to the second sidewall 326, and protrudes from a second end of the first sidewall 324 substantially perpendicularly to the first sidewall.

The coupling portion 322 may be integrally formed with the lamp fixing portion 330. Alternatively, the lamp fixing portion 330 may be separately formed and then adhered to the coupling portion 322 of the board insertion portion 320. In this case, when the lamp holder 300 becomes defective, only one of the board insertion portion 320 and the lamp fixing portion 330 may be replaced, thereby reducing the maintenance and repair cost of the lamp holder 300.

The coupling portion 322 has an area greater than the lamp fixing portion 330, and the first, second and third sidewalls 324, 326 and 327. Particularly, an edge portion of the coupling portion 322 outwardly protrudes in comparison with the lamp fixing portion 330, and the first, second and third sidewalls 324, 326 and 327. A stepped portion 224 is formed in the receiving portion 220 corresponding to a protruding portion of the coupling portion 322.

When the board insertion portion 320 is received in the receiving portion 220, the coupling portion 322 is coupled to the stepped portion 224. Thus, the lamp holder 300 may be received in the receiving portion 220 by a constant depth regardless of a depth of the receiving portion 220. Hence, the board insertion portion 320 may be prevented from moving in a space that is formed between the first, second and third sidewalls 324, 326 and 327 and the receiving portion 220.

A hook 328 is formed on an outer surface of the second and third sidewalls 326 and 327 of the board insertion portion 320. A coupling groove 225 is formed on the receiving portion 220 to be coupled to the hook 328. When the board insertion portion 320 is inserted into the receiving portion 220, the hook 328 is coupled to the coupling groove 225 to prevent movement of the lamp holder 300 in the second direction 'y'. With the above mechanisms, the lamp holder 300 and the fixing member 200 may be strongly coupled to each other.

When the board insertion portion 320 of the lamp holder 300 is received in the receiving portion 220 of the fixing member 200, the coupling portion 322 and the hook 328 of the board insertion portion 320 is coupled to the stepped portion 224 and the coupling groove 225 of the receiving portion 220, respectively, thereby fastening the lamp holder 300 to the fixing member 200.

The lamp holder 300 may further include a holder cap 400 that fixes the conductive socket 340 inserted into the holder body 310 to prevent movement of the conductive socket 340. The holder cap 400 may be fixed to the holder body 310 using the hook-coupling method. The holder cap 400 presses a second connection portion 360 of the conductive socket 340, which is electrically connected to the lead 510 of the lamp 500, to thereby strongly connect the lead 510 and the second connection portion 360.

Figure 4:
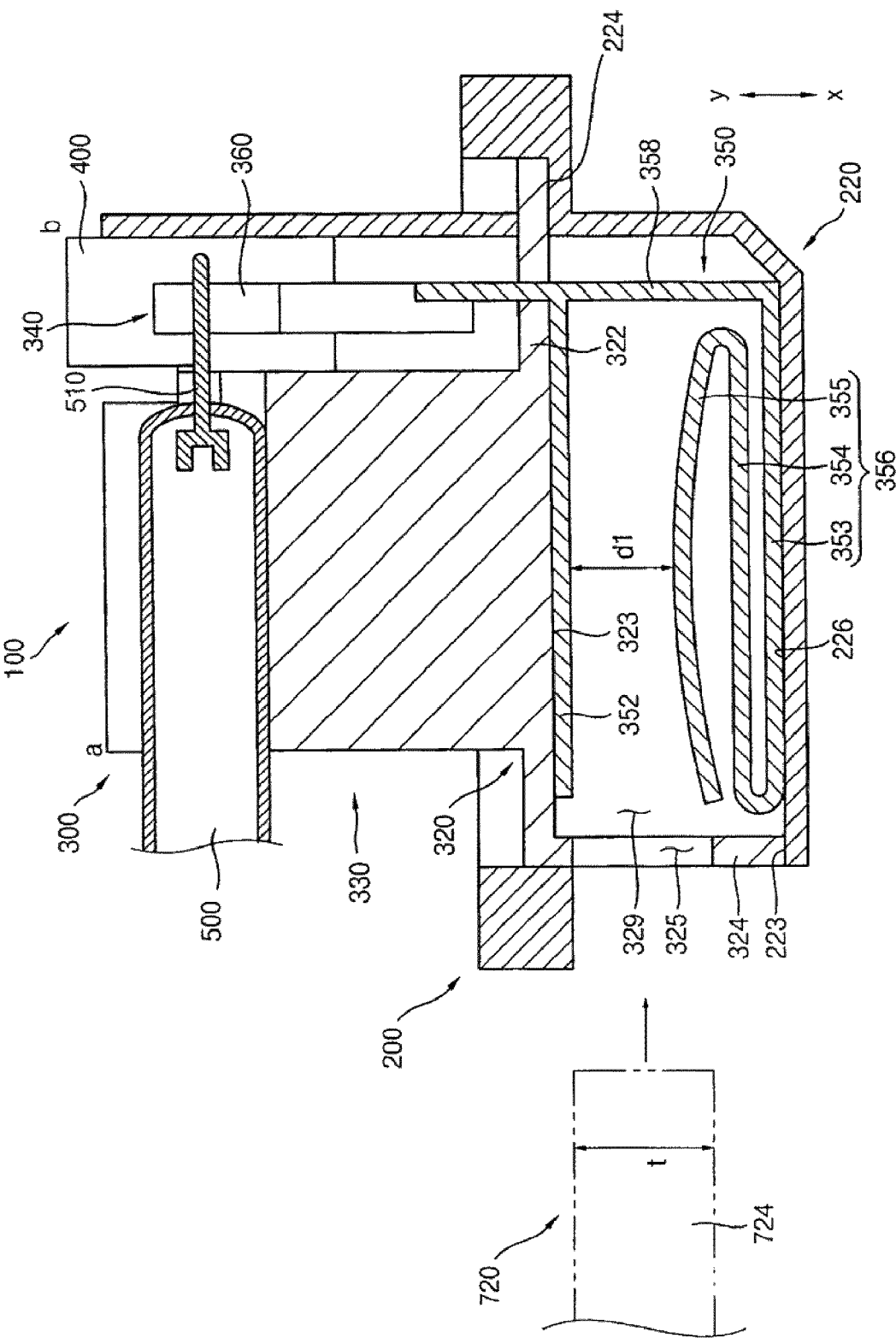
FIG. 4 is a cross-sectional view taken along the line I-I' in FIG. 2 and illustrating a conductive socket according to an exemplary embodiment of the present invention.
Figure 5:
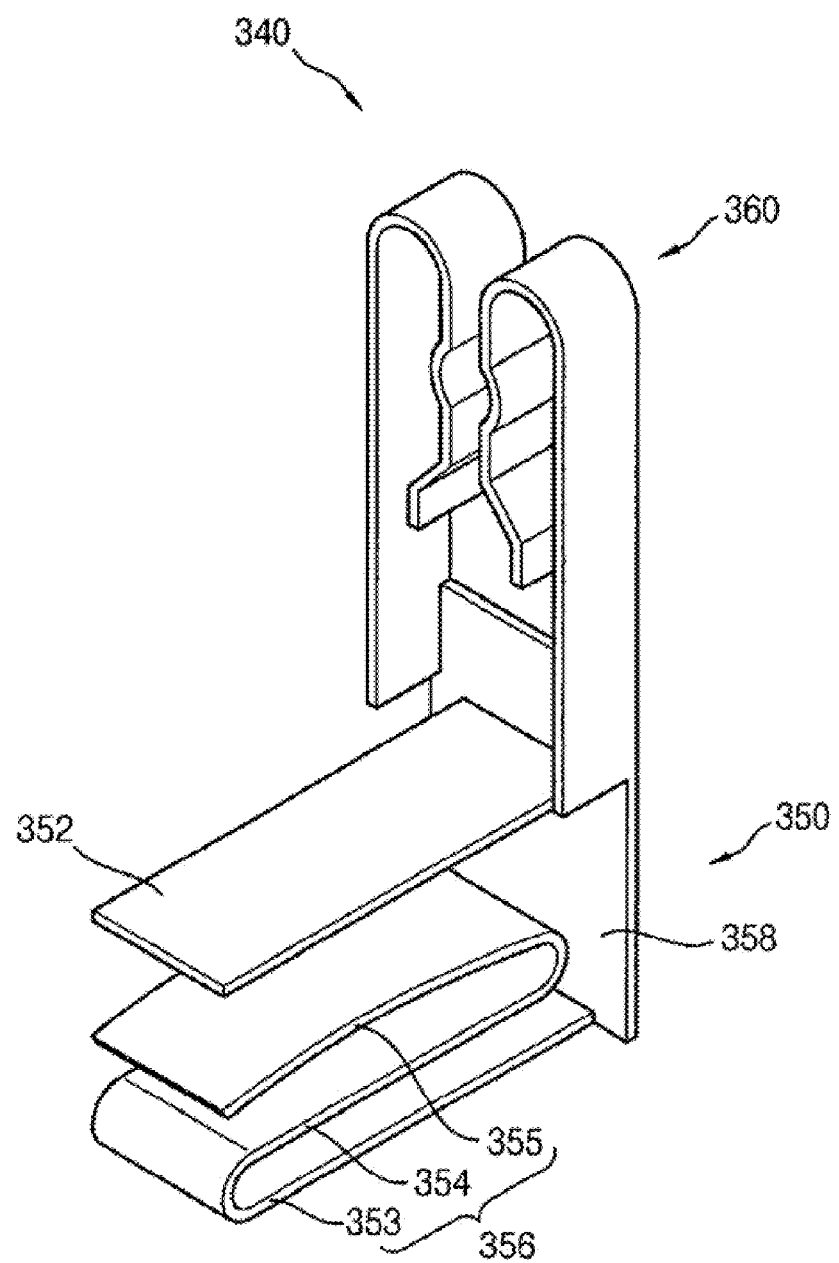
FIG. 5 is a perspective view illustrating the conductive socket illustrated in FIG. 4.

FIG. 4 is a cross-sectional view taken along the line I-I' in FIG. 2 and illustrating a conductive socket according to an exemplary embodiment of the present invention. FIG. 5 is a perspective view illustrating the conductive socket illustrated in FIG. 4.

Referring to FIGS. 4 and 5, the conductive socket 340 of the lamp holder 300 includes a first connection portion 350 disposed in the board insertion portion 320, and a second connection portion 360 disposed in the lamp fixing portion 330.

The first connection portion 350 is electrically connected to a power supply terminal 724 of a power supply member 720. The board insertion portion 320 is received in the receiving portion 220 of the fixing member 200 to form an insertion space 329, and the first connection portion 350 is disposed in the insertion space 329. Although the first, second and third sidewall 324, 326 and 327 of the board insertion portion 320, which are substantially perpendicular to the coupling portion 322, do not define a space, the insertion space 329 forms when the board insertion portion 320 is received in the receiving space 222 of the receiving portion 220.

The insertion space 329 is formed partly by the receiving space 222 formed in the receiving portion 220. The insertion space 329 is exposed by the second opening 325 formed at the first sidewall 324 of the board insertion portion 320 and the first opening 223 formed at the receiving portion 220. Thus, the first connection portion 350 is also exposed.

The first connection portion 350 includes a first terminal 352 disposed at an upper portion of the insertion space 329, a second terminal 356 disposed at a lower portion of the insertion space 329 and a third terminal 358 extending from a side of the first terminal 352 and a side of the second terminal 356 to the second connection portion 360. The third terminal 358 is formed at a side of the first and second terminals 352 and 356, the side facing the first sidewall 324 of the board insertion portion 320.

The first terminal 352 makes contact with an upper surface of the power supply terminal 724. The first terminal 352 extends from the third terminal 358 along a lower surface of the coupling portion 322, and is substantially parallel to the power supply terminal 724.

The second terminal 356 makes contact with a lower surface of the power supply terminal 724. The second terminal 356 is bent in a direction substantially parallel to the power supply terminal 724, and thus has a certain level of spring-like force. Particularly, the second terminal 356 includes a first extension portion 353 extending from the third terminal 358 along a bottom surface 226 of the receiving portion 220, a second extension portion 354 extending from an end of the first extension portion 353 in an opposite direction, and a third extension portion 355 extending from an end of the second extension portion 354 forming a curved profile (in the particular example, forming a convex surface).

The third extension portion 355 exerts a force in the second direction 'y'. Particularly, when an external force is applied to the third extension portion 355 in the first direction 'x', the force of the third extension portion 355 acts in the second direction 'y'. The second extension portion 354 also has a force in substantially the same direction as the force of the third extension portion 355. The force of the second extension portion 354, however, is smaller than the force of the third extension portion 355. The first extension portion 353 makes contact with the bottom surface 226 of the receiving portion 220 and supports the second and third extension portions 353 and 354 so that the second and third extension portions 353 and 354 may have the force.

When the power supply terminal 724 of the power supply member 720, which is inserted into the insertion space 329, is electrically connected to the second terminal 356, the third extension portion 355 of the second terminal 356 may increase a connection force and prevent the movement of the power supply terminal 724. A distance d1 between the third extension portion 355 and the first terminal 352 is smaller than a thickness 't' of the power supply terminal 724, so that the elastic force of the third extension portion 355 of the second terminal 356 may be effective.

The force becomes stronger as the distance d1 between the third extension portion 355 and the first terminal 352 decreases, and weaker as the distance d1 between the third extension portion 355 and the first terminal 352 increases. Thus, the distance d1 between the third extension portion 355 and the first terminal 352 may be controlled to fix the power supply terminal 724.

The third extension portion 355 may have a round shape so that the power supply terminal 724 may be easily inserted into the insertion space 329. Alternatively, the third extension portion 355 may have an angled shape to increase the connection force. As yet another alternative, when the size of a product is small, the second extension portion 354 may be removed and thus the third extension portion 355 may be connected to an end of the first extension portion 353. As yet another alternative, the first and second terminals 352 and 356 may be mirror images of the shape described above.

The second connection portion 360 protrudes from the third terminal 358 of the first connection portion 350 and is electrically connected to the lead 510 of the lamp 500. The second connection portion 360 is formed near the lamp fixing portion 330. Particularly, the lamp fixing portion 330 is formed so that the lamp 500 is inserted from a first side of the lamp holder 300, and the second connection portion 360 is formed corresponding to a second side opposite to the first side of the lamp holder 300.

The first and second openings 223 and 325 are formed on the side of the lamp fixing unit 100 that receives the first side of the lamp holder 300. The lamp 500 and the power supply terminal 724 are inserted from the first side of the lamp holder 300.

As described above, the first connection portion 350 fixes the power supply terminal 724 using the force of the third extension portion 355 of the second terminal 356. Thus, the driving voltage generated from the power supply member 720 is applied to the second connection portion 360 and the lead 510 of the lamp 500 from the first and second terminals 352 and 356 through the third terminal 358, thereby driving the lamp 500 to generate light.

Figure 6:
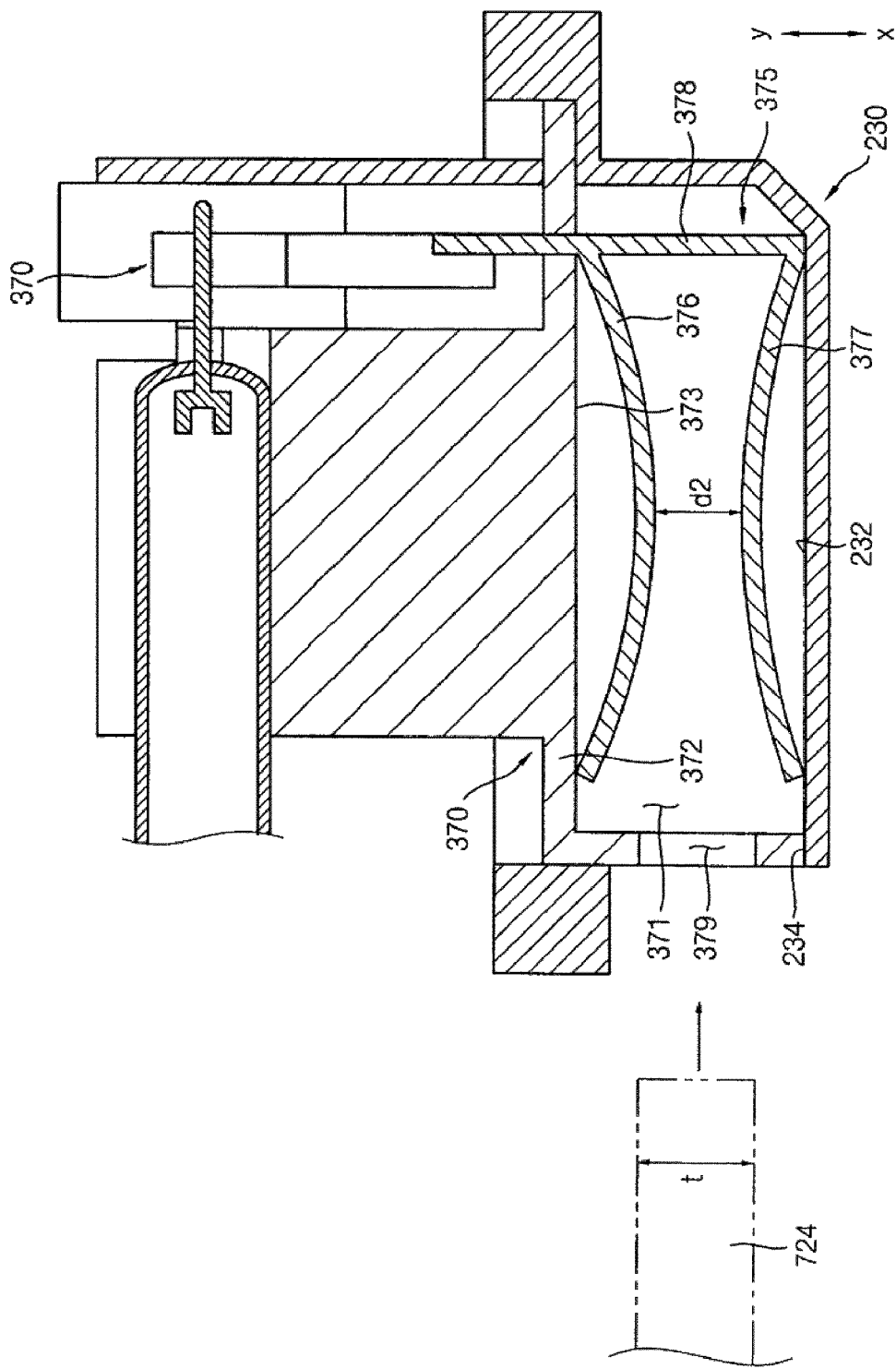
FIG. 6 is a cross-sectional view taken along the line I-I' in FIG. 2 and illustrating a conductive socket according to another exemplary embodiment of the present invention.
Figure 7:
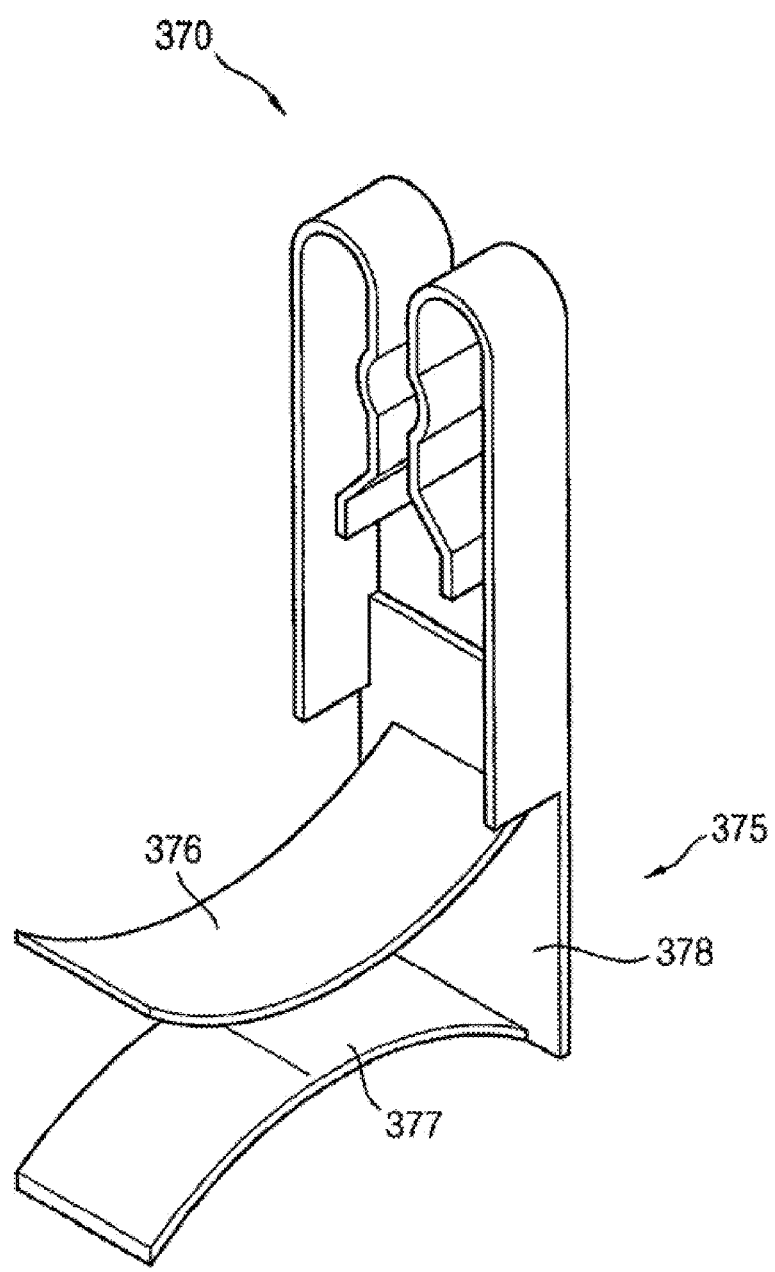
FIG. 7 is a perspective view illustrating the conductive socket illustrated in FIG. 6.

FIG. 6 is a cross-sectional view taken along the line I-I' in FIG. 2 and illustrating a conductive socket according to another exemplary embodiment of the present invention. FIG. 7 is a perspective view illustrating the conductive socket illustrated in FIG. 6.

Referring to FIGS. 6 and 7, first and second terminals 376 and 377 of a first connection portion 375 of a conductive socket 370 has a shape that is convex to a central portion of an insertion space 371, or the power supply terminal 724.

The first and second terminals 376 and 377 are formed in the insertion space 371 corresponding to a lower surface 373 of a connection portion 372 and a bottom surface 232 of a receiving portion 230. Particularly, the first terminal 376 curves away from the lower surface 373 of the connection portion 372 to the bottom surface 232 of the receiving portion 230 to form a dome-shaped surface, and the second terminal 377 curves in the opposite direction from the first terminal 376 to also form a dome-shaped surface. The dome-shaped surfaces of the first terminal 376 and the second terminal are closest to each other near the centers of the domes.

Thus, the first and second terminals 376 and 377 are substantially symmetrical to each other with respect to a plane that is located halfway between them. In FIGS. 6 and 7, the first and second terminals 376 and 377 have a round shape. However, this is not a limitation of the invention and the first and second terminals 376 and 377 may have an angled shape.

The first and second terminals 376 and 377 exert forces in opposite directions. Particularly, the first terminal 376 exerts a force in the first direction 'x', and the second terminal 377 exerts a force in the second direction 'y'. In order to supplement the forces of the first and second terminals 376 and 377, additional elastic members may be disposed over and under the first and second terminals 376 and 377, respectively.

A distance d2 between the first and second terminals 376 and 377 is smaller than the thickness 't' of the power supply terminal 724 inserted into the insertion space 371 through first and second openings 234 and 379.

The forces applied in the first and second directions 'x' and 'y' enlarge longitudinal components of the first and second terminals 376 and 377, respectively. Thus, a predetermined space may be formed between the ends of the first and second terminals 376 and 377 and the board insertion portion 370.

Accordingly, when the forces are applied in the first and second directions 'x' and 'y', the first and second terminals 376 and 377 clamp down on the power supply terminal 724 to strongly fix the power supply terminal 724. Thus, the first and second terminals 376 and 377 become stably electrically connected to the power supply terminal 724.

Figure 8:
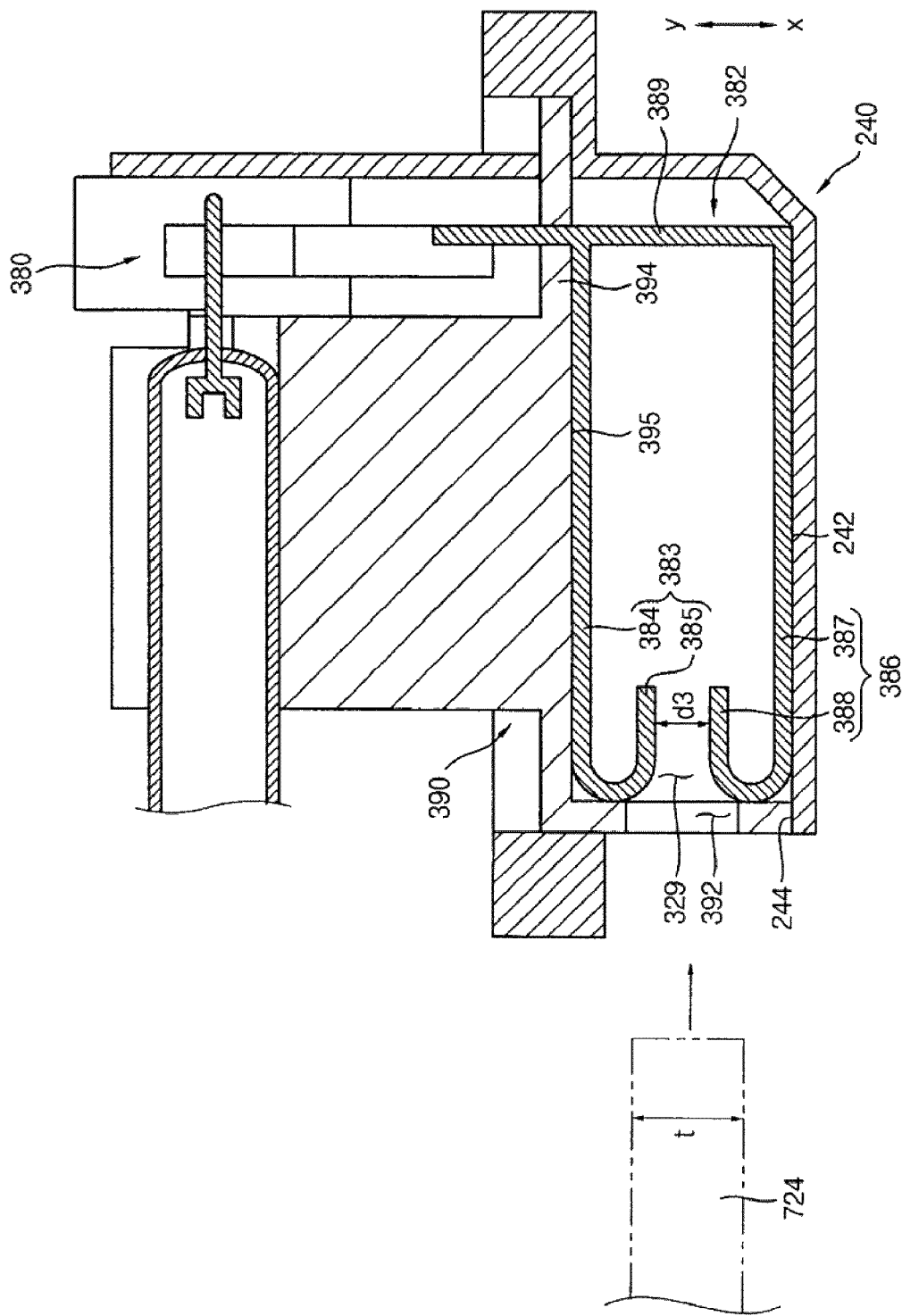
FIG. 8 is a cross-sectional view taken along the line I-I' in FIG. 2 and illustrating a conductive socket according to still another exemplary embodiment of the present invention.
Figure 9:
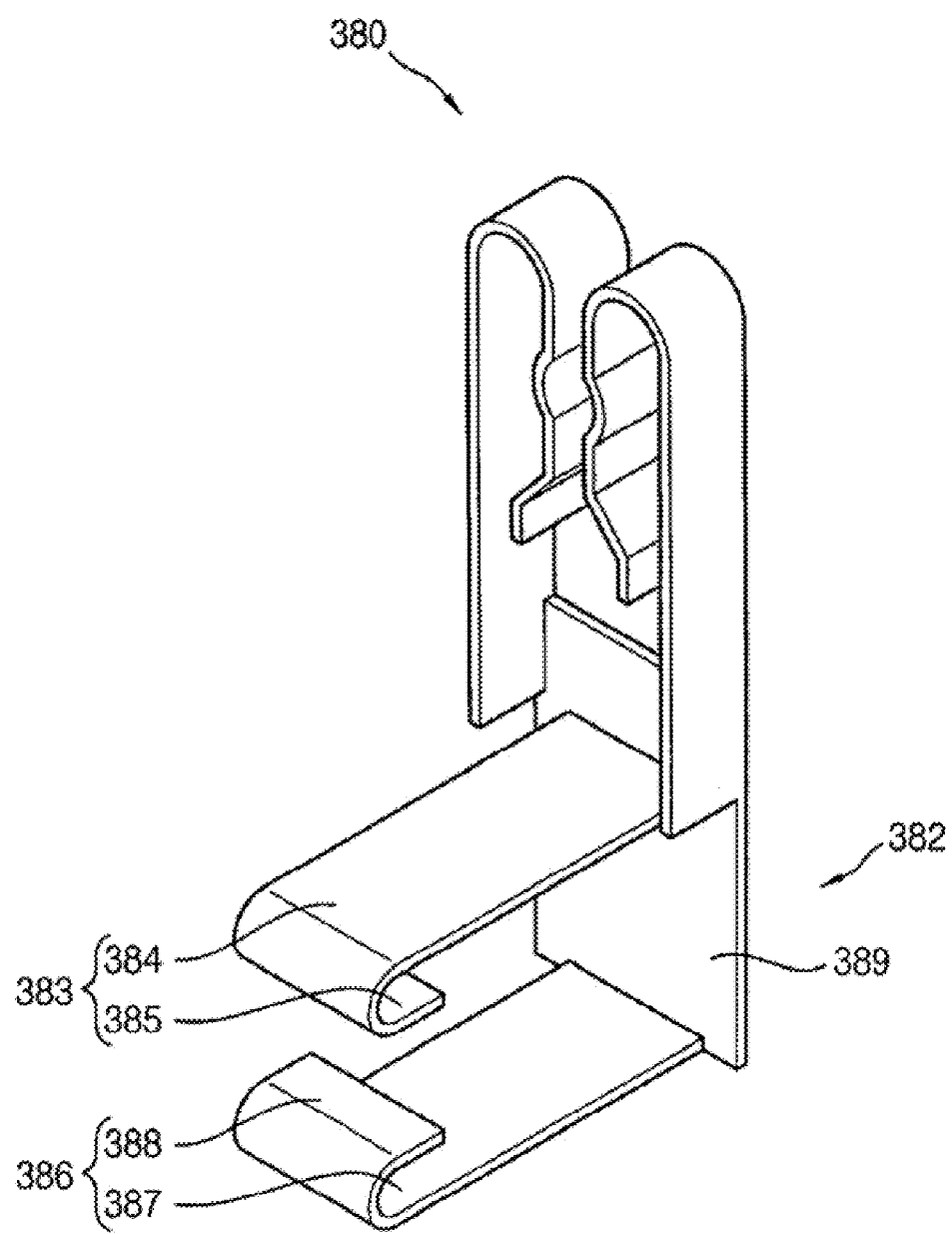
FIG. 9 is a perspective view illustrating the conductive socket illustrated in FIG. 8.

FIG. 8 is a cross-sectional view taken along the line I-I' in FIG. 2 and illustrating a conductive socket according to yet another exemplary embodiment of the present invention. FIG. 9 is a perspective view illustrating the conductive socket illustrated in FIG. 8.

Referring to FIGS. 8 and 9, a first connection portion 382 of a conductive socket 380 includes first and second terminals 383 and 386. Each of the first and second terminals 383, 386 has a rounded portion near a second opening 392.

The second terminal 386 includes a first extension portion 387 extending from a third terminal 389 along a bottom surface 242 of a receiving portion 240 and a second extension portion 388 bent by about 180° in a rounded manner from an end of the first extension portion 387 to the second opening 392.

An end portion of the second terminal 386 is bent by about 180° in a rounded manner to form the first extension portion 387 and the second extension portion 388. The second terminal 386 typically has a small size, and thus the second terminal 386 may be formed using a small tool such as pliers, not a machine tool such as a bending machine.

The second extension portion 388 is rounded so that it exerts a reactive force in the second direction 'y' in response to a force applied in the first direction 'x'. The first extension portion 387 makes contact with the bottom surface 242 of the receiving portion 240 and supports the second extension portion 388 so that the second extension portion 388 may exert the force in the second direction 'y'. The force exerted by the second extension portion 388 may differ in accordance with the length and a curvature of the second terminal 386.

The conductive socket 380 further includes the first terminal 383. The first terminal 383 includes a third extension portion 384 extending from the third terminal 389 along a lower surface 395 of a coupling portion 394 of a board insertion portion 390 and a fourth extension portion 385 that is an extension of the third extension portion 384 that is bent in a rounded manner to the second opening 392.

The first and second terminals 383 and 386 are arranged substantially symmetrically to each other with respect to an imaginary plane that extends halfway between them. Accordingly, a space between the fourth extension portion 385 of the first terminal 383 and the second extension portion 388 of the second terminal 386 is formed to fix the power supply terminal 724 inserted through the first and second openings 244 and 392.

The second extension portion 388 and the fourth extension portion 385 are near the second opening 382 to effectively fix the power supply terminal 724 even in cases where the inserted depth of the power supply terminal 724 is shallow. A distance d3 between the second extension portion 388 and the fourth extension portion 385 is smaller than the thickness 't' of the power supply terminal 724, so that the first and second terminals 383, 386 will clamp down on the power supply terminal 724 securely.

Figure 10:
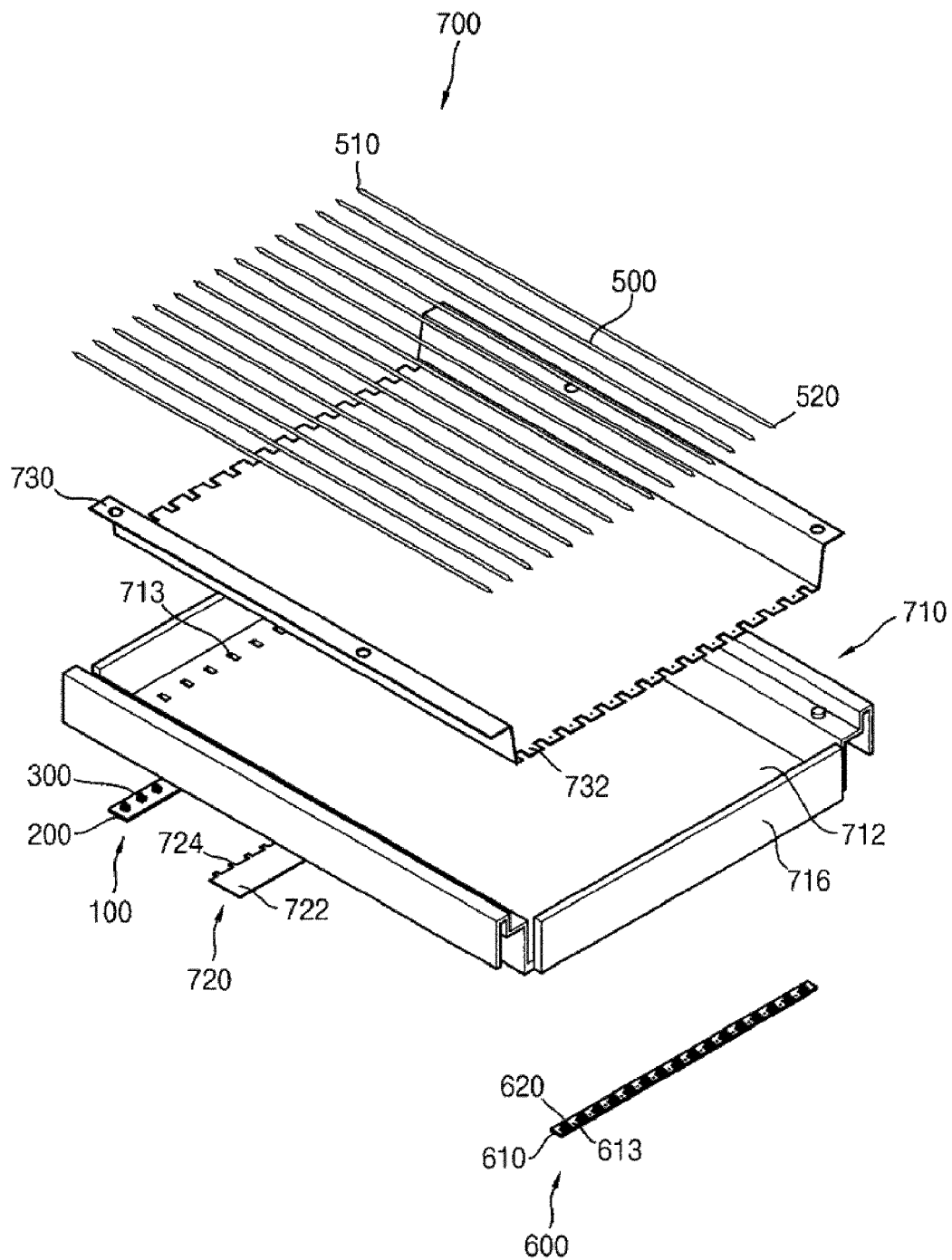
FIG. 10 is a perspective view illustrating a backlight assembly according to an exemplary embodiment of the present invention.
Figure 11:
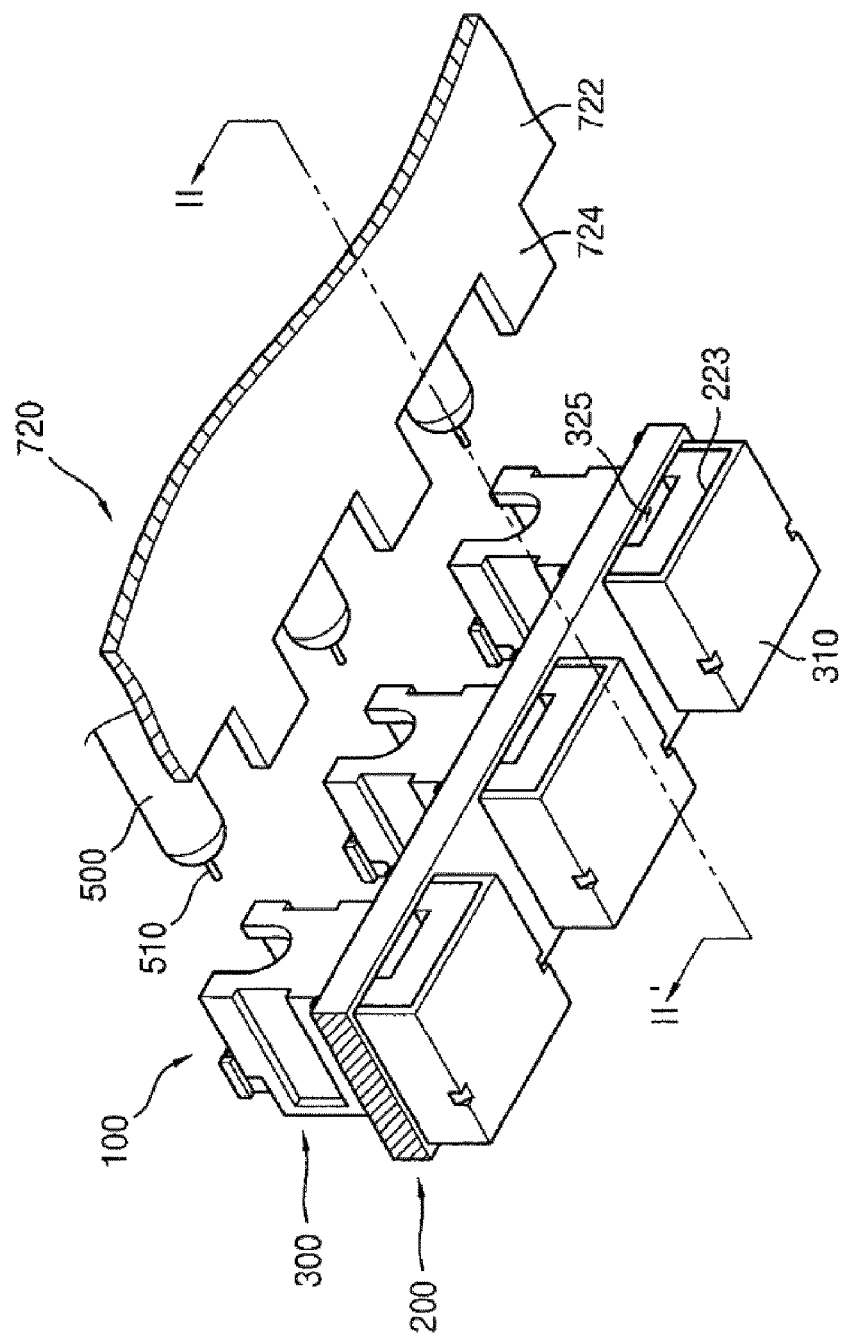
FIG. 11 is a perspective view illustrating lamps, a first lamp fixing unit and a power supply member illustrated in FIG. 10.
Figure 12:
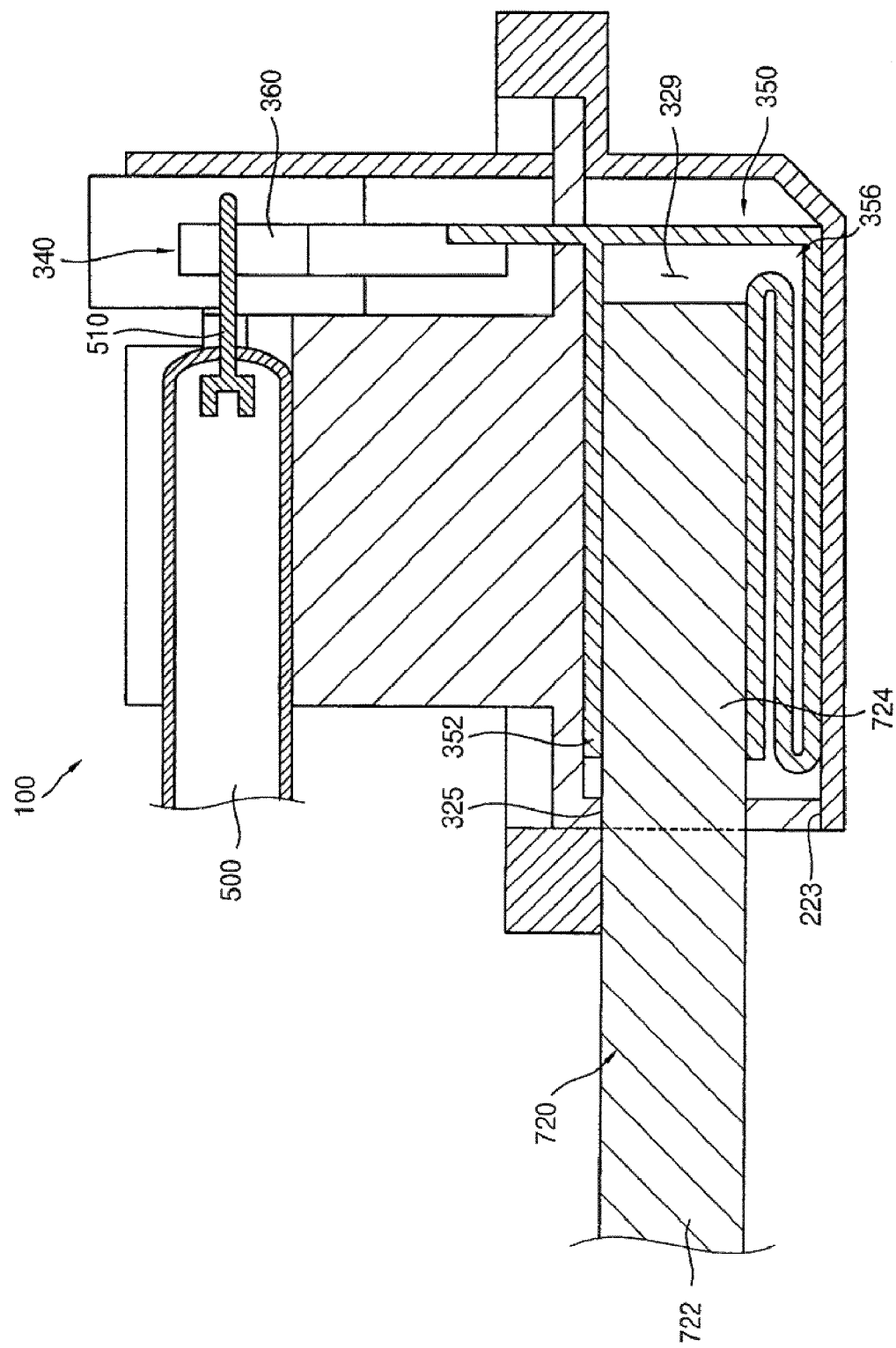
FIG. 12 is a cross-sectional view taken along the line II-II' in FIG. 11.

FIG. 10 is a perspective view illustrating a backlight assembly according to an exemplary embodiment of the present invention. FIG. 11 is a perspective view illustrating lamps, a first lamp fixing unit and a power supply member illustrated in FIG. 10. FIG. 12 is a cross-sectional view taken along the line II-II' in FIG. 11.

In FIGS. 10 to 12, the first lamp fixing unit is substantially the same as the lamp fixing unit illustrated in FIGS. 1 through 9. Thus, substantially the same parts are represented by the same reference numerals, and any redundant description concerning the same parts will be omitted.

Referring to FIGS. 10 to 12, a backlight assembly according to an exemplary embodiment of the present invention includes a receiving container 710, a plurality of lamps 500, a first lamp fixing unit 100, a second lamp fixing unit 600 and a power supply member 720.

The receiving container 710 includes a bottom plate 712 and a side portion 716 protruding from an edge portion of the bottom plate 712. A plurality of first exposing holes 713 is formed at the bottom plate so that the first lamp holder of the first lamp fixing unit 100 can extend through them. The receiving container 710 includes, for example, metal that has great strength and electrical conductivity.

The lamps 500 are received in the receiving container 710 such that they are substantially parallel to each other. A power source lead 510 is formed at a first end portion of each lamp 500, and a ground lead 520 is formed at a second end portion of each lamp 500. A lamp driving voltage generated from the power supply member 720 is applied to the power source lead 510 through the first lamp fixing unit 100. The ground lead 520 is coupled to the receiving container 710 through the second lamp fixing unit 600 to consistently maintain the lamp driving voltage.

Thus, the lamps 500 generate light in response to the lamp driving voltage received from the power supply member 720. The lead 510 shown in FIGS. 3 and 4 corresponds to the power source lead 510 in FIGS. 10 to 12. The lamps 500 may include a cold cathode fluorescent lamp (CCFL) with an electrode formed inside.

The second lamp fixing unit 600 includes an array plate 610 that is coupled to the receiving container 710 to electrically connect to the ground lead 520 and a plurality of second lamp holders 620 that is arranged on and fixed to the array plate 610.

The power supply member 720 is disposed on the rear surface ("rear" being the underside in FIG. 10) of the bottom plate 712 of the receiving container 710. The power supply member 720 includes a plurality of transformers (not shown). Thus, the power supply member 720 transforms an externally provided voltage to the lamp driving voltage for generating light from the lamp 500, and applies the lamp driving voltage to the lamp 500 through the first lamp holder 300 and the power source lead 510.

The power supply member 720 includes a power supply board 722 and a plurality of power supply terminals 724 that protrude from a side of the power supply board 722 toward the fixing member 200. The power supply member 720 is coupled to the first lamp holder 300.

The number of the power supply terminals 724 is the same as the number of the first lamp holders 300. Thus, each of the power supply terminals 724 may be coupled to one of the first lamp holders 300. The power supply terminals 724 extend from the power supply board 722, and have exposed electric wirings (not shown). The power supply terminals 724 have a cross-sectional area that is a bit smaller than or equal to a cross-sectional area of the second opening 325.

The power supply terminals 724 are inserted into and fixed to the first lamp holders 300 of the first lamp fixing unit 100, and coupled to the first connection portions 350. Particularly, the power supply terminals 724 are inserted into the insertion space 329 of the first lamp holders 300 to be coupled to the first terminal 352 or the second terminal 356 of the first connection portion 350 of the first conductive socket 340.

Each of the power supply terminals 724 is fixed by the clamping force of the first terminal 352 and/or the second terminal 356 of the first connection portion 350. For example, both top and bottom surfaces of each power supply terminal 724 are pressed by the first terminal 352 and/or the second terminal 356 to be fixed. Since one of the first terminal 352 and the second terminal 356 is dome-shaped near a central portion of the insertion space 329, the power supply terminal 724 may be easily inserted into the insertion space 329 by "squashing" the domes down.

As described above, the power supply terminal 724 of the power supply member 720 is pressed by and electrically connected to the first terminal 352 and the second terminal 356 to supply the lamp driving voltage to the third terminal 358 of the first connection portion 350. Also, the third terminal 358 supplies the lamp driving voltage to the lamp 500 through the second connection portion 360 and the power source lead 510 to thereby generate light from the lamp 500.

Accordingly, only insertion and disinsertion of the power supply terminal 724 into the insertion space 329 through the first and second openings 223 and 325 easily connect the power supply member 720 to the second connection portion 360 of the first conductive socket 340 electrically and easily couple and uncouple the power supply member 720 to the first lamp holder 300.

The backlight assembly 700 may further include a light-reflecting member 730. The light-reflecting member 730 is disposed between the lamps 500 and the receiving container 710 to reflect any light that propagates downward from the lamps 500.

Figure 13:
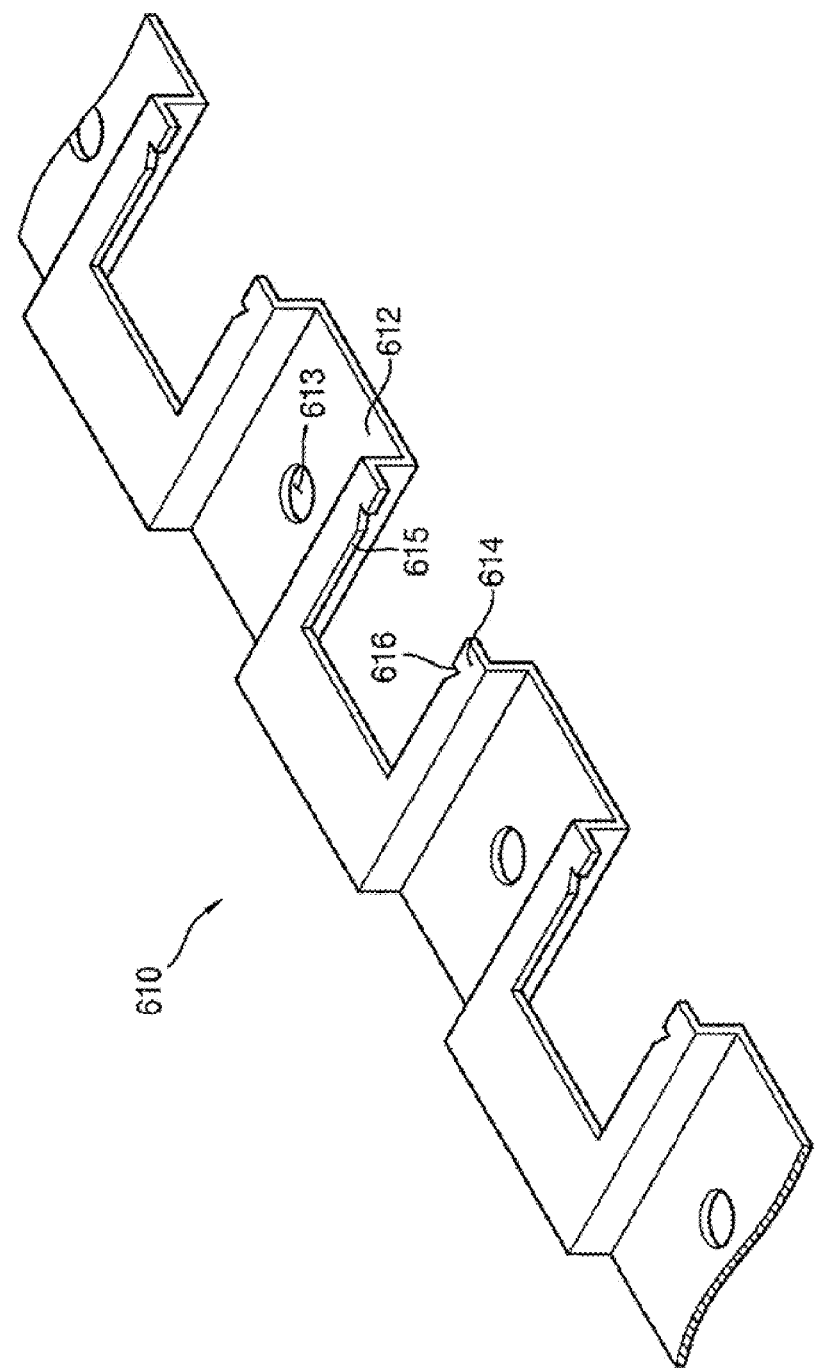
FIG. 13 is an enlarged perspective view of an array plate illustrated in FIG. 10.
Figure 14:
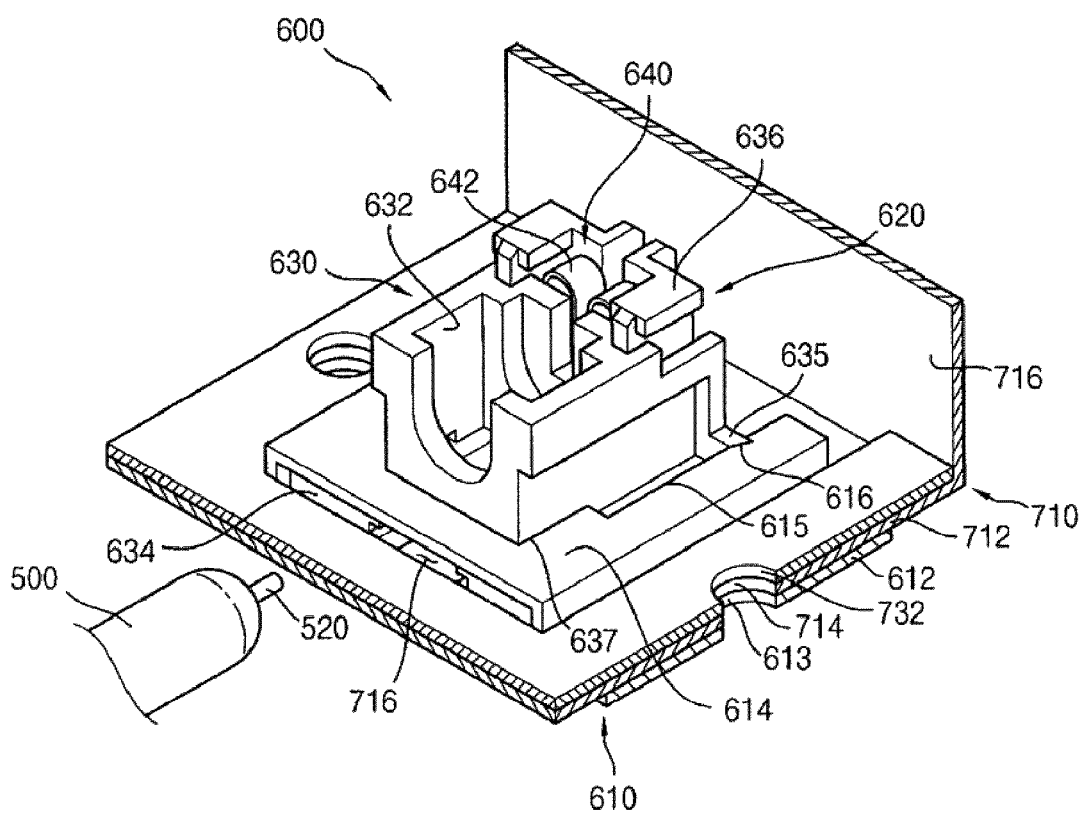
FIG. 14 is an enlarged perspective view of the lamp, the second lamp fixing unit and the receiving container illustrated in FIG. 10.

FIG. 13 is an enlarged perspective view of an array plate illustrated in FIG. 10. FIG. 14 is an enlarged perspective view of the lamp, the second lamp fixing unit and the receiving container illustrated in FIG. 10.

Referring to FIGS. 10, 13 and 14, the array plate 610 of the second lamp fixing unit 600 has a shape for coupling to at least two ground leads 520.

Particularly, the array plate 610 extends in a direction substantially perpendicular to the length of the lamps 500. Alternatively, the second lamp fixing unit 600 may include a plurality of array plates 610, for example two or three array plates 610. In this case, the number of array plates is smaller than the total number of the ground leads 520.

The array plate 610 is electrically coupled to the receiving container 710. Particularly, the array plate 610 is coupled to an outside surface of the receiving container 710, for example by being coupled to a rear surface of the bottom plate 712. Alternatively, the array plate 610 may be coupled to the inside of the receiving container 710.

The array plate 610 may include a metal having good electrical conductivity, such as the array plate 610 includes stainless use steel (hereinafter referred to as "SUS") having great strength. Alternatively, the array plate 610 may include aluminum (Al) when light weight is an important factor.

The array plate 610 is typically formed by using a mold. Alternatively, the array plate 610 may be formed from SUS having a predetermined thickness by using machine tools such as a bending machine, a milling machine, a bench drilling machine, etc.

The array plate 610 includes a container coupling portion 612 and a holder fixing portion 614. The container coupling portion 612 is coupled to the receiving container 710. The second lamp holder 620 is inserted and fixed to the holder fixing portion 614. For example, the container coupling portion 612 is alternately formed with the holder fixing portion 614 to be coupled to a rear surface of the receiving container 710. The holder fixing portion 614 and the container coupling portion 612 may form a stepped portion.

The holder fixing portion 614 is inserted through the second exposing hole 718. Thus, the holder fixing portion 614 exposes the second lamp holder 620, and the container coupling portion 612 may make contact with the rear surface of the receiving container 710. The area of the holder fixing portion 614 is a bit smaller than or equal to a size of the second exposing hole 718.

The container coupling portion 612 is coupled to the rear surface of the receiving container 710 with a bolt. A first coupling cutout 613 is formed at the container coupling portion 612, and a second coupling cutout 714 is formed at the bottom plate 712 of the receiving container 710. Alternatively, the container coupling portion 612 and the bottom plate 712 may be coupled to each other by a rivet that extends through the first coupling cutout 613 and the second coupling cutout 714.

In FIGS. 13 and 14, one first coupling cutout 613 and one second coupling cutout 714 are formed at the container coupling portion 612 and the bottom plate 712, respectively. Alternatively, when the backlight assembly 700 has a large area, more than one first coupling cutout 613 and more than one second coupling cutout 714 may be formed at the container coupling portion 612 and the bottom plate 712, respectively.

A plurality of second lamp holders 620 are arranged on and fixed to the holder fixing portion 614 of the array plate 610. Particularly, the second lamp holder 620 extends through and becomes fixed to the holder fixing portion 614. Thus, the holder fixing portion 614 includes a first insertion groove 615 that is recessed by a predetermined depth from a side. The second lamp holder 620 is partially inserted into the first insertion groove 615 and fixed to the array plate 610.

The second lamp holder 620 includes an insulation body 630 and a second conductive socket 640. The insulation body 630 may include a resin that provides good electrical insulation and is easily workable. The insulation body 630 includes a lamp fixing portion 632 that fixes an end portion of the lamp 500 having the ground lead 520 and a body coupling portion 634 that is inserted in and fixed to the holder fixing portion 614.

The holder fixing portion 614 includes coupling grooves 616 that are formed at parallel side portions and define the first insertion groove 615. The holder fixing portion 614 also includes the body coupling portion 634, which includes hooks 635 that are positioned to connect to the coupling grooves 616. Since the hooks 635 are coupled to the coupling grooves 616 of the holder fixing portion 614, the body coupling portion 634 does not separate from the second lamp holder 620 while the second lamp holder 620 is inserted into the array plate 610.

The second conductive socket 640 is inserted into the insulation body 630. The insulation body 630 includes a holder cap 636 that is coupled to and uncoupled from the insulation body 630 at an upper portion of the insulation body 630. As such, after the holder cap 636 is uncoupled from the insulation body 630, the second conductive socket 640 is inserted into and coupled to the insulation body 630.

As described above, in the backlight assembly 700, the second lamp holder 620 inserts into and fixes to the holder fixing portion of the array plate 610, and the holder fixing portion 614 and the second lamp holder 620 are inserted into the second exposing hole 718. Thus, the container coupling portion 612 of the array plate 610 and the bottom plate 712 of the receiving container 710 are electrically coupled to each other.

The light-reflecting member 730 may include third coupling cutouts 732 that are positioned to align with the first and second coupling cutouts 613 and 714 so that the light-reflecting member 730 may not be an obstacle to the bolt-coupling of the array plate 610 and the receiving container 710.

Figure 15:
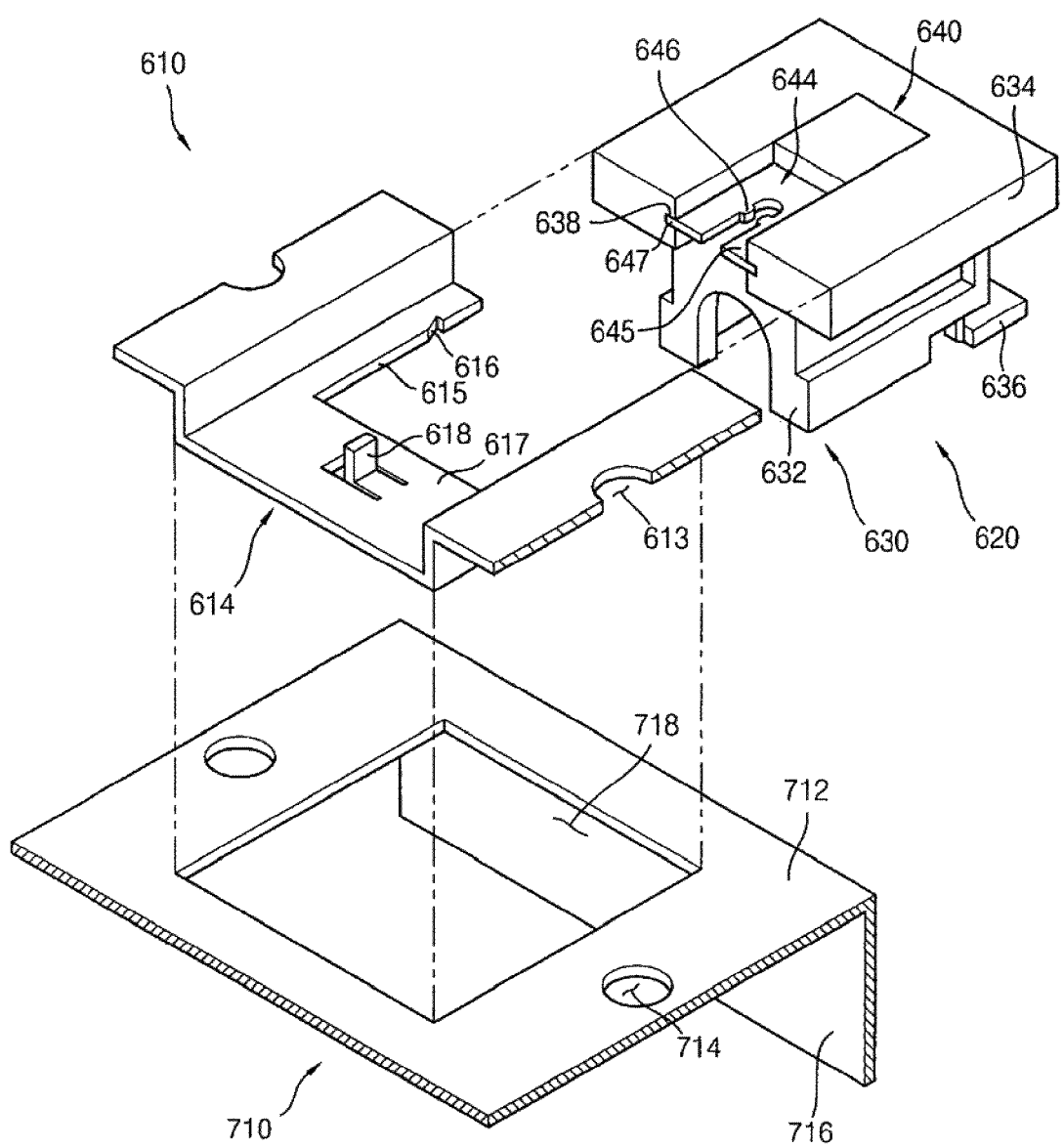
FIG. 15 is an exploded perspective view illustrating the receiving container illustrated in FIG. 14 and a second lamp fixing unit according to a first exemplary embodiment of the present invention.

FIG. 15 is an exploded perspective view illustrating the receiving container illustrated in FIG. 14 and a second lamp fixing unit according to a first exemplary embodiment of the present invention.

In FIG. 15, the second lamp holder and the array plate have substantially the same structure as the second lamp holder and the array plate illustrated in FIGS. 10, 13 and 14. Thus, substantially the same parts will be represented by the same reference numerals.

Referring to FIGS. 14 and 15, after the body coupling portion 634 of the insulation body 630 slides into a side surface of the holder fixing portion 614 of the array plate 610 and the first insertion groove 615 to be inserted into and fixed to the array plate 610, the second lamp holder 620 extends through the second exposing hole 718 of the bottom plate 712 of the receiving container 710.

The body coupling portion 634 may further include a second insertion groove 637 that is formed to couple to the first insertion groove 615. Thus, the body coupling portion 634 may be inserted into the array plate 610 more deeply than the depth of the first insertion groove 615, thereby firmly fixing to the holder fixing portion 614.

The second conductive socket 640 inserted into the insulation body 630 electrically connects the ground lead 520 and the array plate 610. The second conductive socket 640 includes a first connection portion 642 connected to the ground lead 520 and a second connection portion 644 bent from the first connection portion 642.

The second connection portion 644 is connected to a lower surface 617 of the holder fixing portion 614. Alternatively, the second connection portion 644 may be connected to an upper surface of the holder fixing portion 614. Also, the second connection portion 644 may be connected to the holder fixing portion 614 through a conductive member. Thus, the ground lead 520 and the array plate 610 are electrically connected to each other through the first and second connection portions 642 and 644.

Accordingly, the body coupling portion 634 of the insulation body 630 of the second lamp holder 620 is inserted into and fixed to the holder fixing portion 614, thereby electrically connecting the ground lead 520 and the array plate 610 through the first and second connection portions 642 and 644 of the second conductive socket 640.

Thus, a conventional ground wire, along with a soldering process and/or a bolt coupling process, are made unnecessary. The grounding the ground lead 520 is thus simplified. Omission of manual procedures such as a soldering and the bolt-coupling makes factory automation possible.

Figure 16:
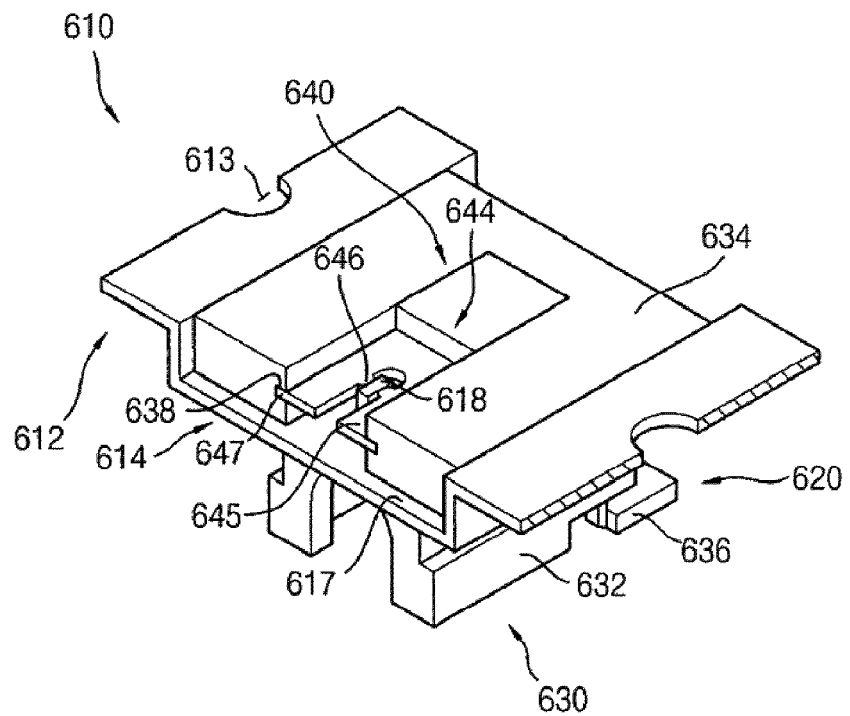
FIG. 16 is a perspective view illustrating the array plate and a second lamp holder illustrated in FIG. 15.
Figure 17:
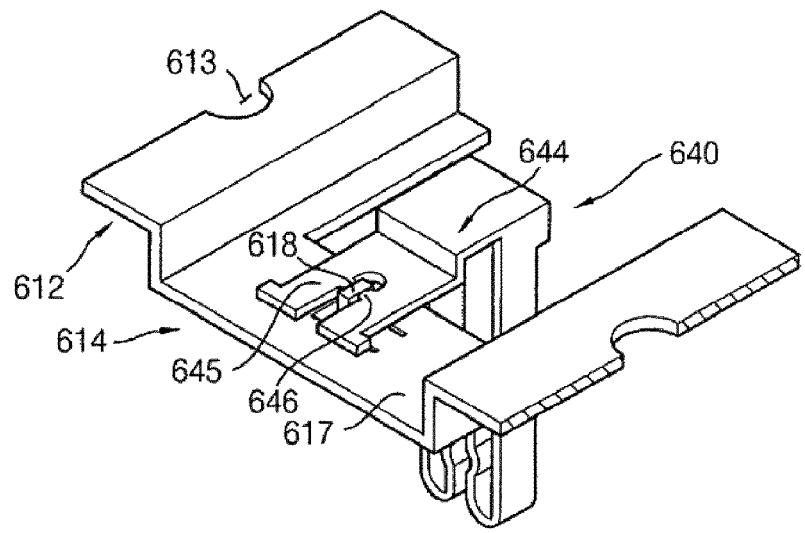
FIG. 17 is a perspective view illustrating the array plate and a second conductive socket illustrated in FIG. 16.

FIG. 16 is a perspective view illustrating the array plate and a second lamp holder illustrated in FIG. 15. FIG. 17 is a perspective view illustrating the array plate and a second conductive socket illustrated in FIG. 16.

Referring to FIGS. 15 to 17, the second connection portion 644 of the second conductive socket 640 includes a coupling terminal 645, and the holder fixing portion 614 includes a protrusion terminal 618 that is designed to couple to the coupling terminal 645. The coupling terminal 645 has, opening this example, a keyhole-like cutout extending from one side toward its center.

The protrusion terminal 618 protrudes from the lower surface 617 of the holder fixing portion 614. The holder fixing portion 614 is partially bent to form the protrusion terminal 618. For example, a portion of the array plate 610 is cut and bent by using a bending machine to form the protrusion terminal 618. In other embodiments, the protrusion terminal 618 may be independently formed and connected to the lower surface 617 of the holder fixing portion 614.

The coupling terminal 645 has, for example, a key-hole shaped cutout and pressure-applying portions 646 inwardly protruding into the key-hole to press on the surfaces of the protrusion terminal 618. The pressure-applying portion 646 is rounded for easy insertion of the protrusion terminal 618 between the pressure-applying portions 646 and easily press on the protrusion terminal 618. The distance between the pressure-applying portions 646 is smaller than the width of the protrusion terminal 618 to properly apply pressure on the protrusion terminal 618.

Thus, the coupling terminal 645 having the pressure-applying portion 646 is formed at an end portion of the second connection portion 644 to press on the protrusion terminal 618 of the holder fixing portion 614, thereby firmly connecting the second connection portion 644 to the array plate 610. Hence, the second connection portion 644 and the holder fixing portion 614 do not disconnect in response to an external force.

The coupling terminal 645 may further include a protruding portion 647 protruding from an end portion of the coupling terminal 645 along a longitudinal direction of the array plate 610. A guide groove 638 may be formed at the body coupling portion 634 and spaced apart from the guide holder fixing portion 614 to guide the protruding portion 647. Alternatively, the guide groove 638 may be formed at a portion of the body coupling portion 634 that makes contact with the holder fixing portion 614.

Figure 18:
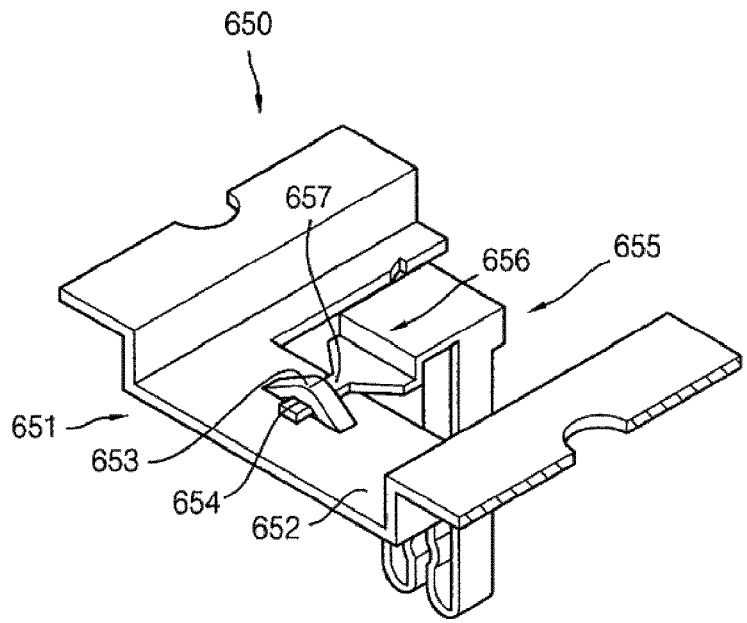
FIG. 18 is a perspective view illustrating an array plate and a second conductive socket of a second lamp fixing unit according to a second exemplary embodiment of the present invention.

FIG. 18 is a perspective view illustrating an array plate and a second conductive socket of a second lamp fixing unit according to a second exemplary embodiment of the present invention.

Referring to FIG. 18, a holder fixing portion 651 of an array plate 650 includes a protrusion terminal 653 protruding from a lower surface 652 of the holder fixing portion 651 and having a fixing hole 654. The second connection portion 656 of the second conductive socket 655 includes a coupling terminal 657 inserted through the fixing hole 654 and fixed to the holder fixing portion 651.

The protrusion terminal 653 has end portions connected to the holder fixing portion 651, thereby forming the fixing hole 654. When forming the array plate 650 by using a mold, the mold may be changed to form the protrusion terminal 653. Alternatively, the holder fixing portion 651 may be punched by a press at a surface that is opposite to a surface with which the second connection portion 656 makes contact, to thereby form the protrusion terminal 653.

An end portion of the coupling terminal 657 is made narrow for easy insertion into the fixing hole 654. When the end portion of the coupling terminal 657 is too small or thin, the coupling terminal 657 could break and be shorted. Thus, the coupling terminal 657 is preferably of a size that has enough strength to avoid such damage. Alternatively, the coupling terminal 657 can be made to have a uniform width, in which case the fixing hole 654 of the protrusion terminal 653 would be made larger to accommodate the wider coupling terminal 657.

The cross-sectional shape of the coupling terminal 657 may be substantially the same as the shape of the fixing hole 654 to increase the contact area between the coupling terminal 657 and the protrusion terminal 653. Alternatively, the height of the fixing hole 654 may be slightly smaller than that of the coupling terminal 657 so that the protrusion terminal 653 may properly press on the coupling terminal 657. In this case, the cross-sectional shape of the coupling terminal 657 may be different from the shape of the fixing hole 654. The cross-sectional shape of the coupling terminal 657 may be substantially uniform for convenience of working.

As described above, in the holder fixing portion 651, the coupling terminal 657 of the second connection portion 656 is easily inserted through the fixing hole 654 of the protrusion terminal 653 and fixed to the array plate 650, thereby electrically connecting the second connection portion 656 to the holder fixing portion 651.

Figure 19:
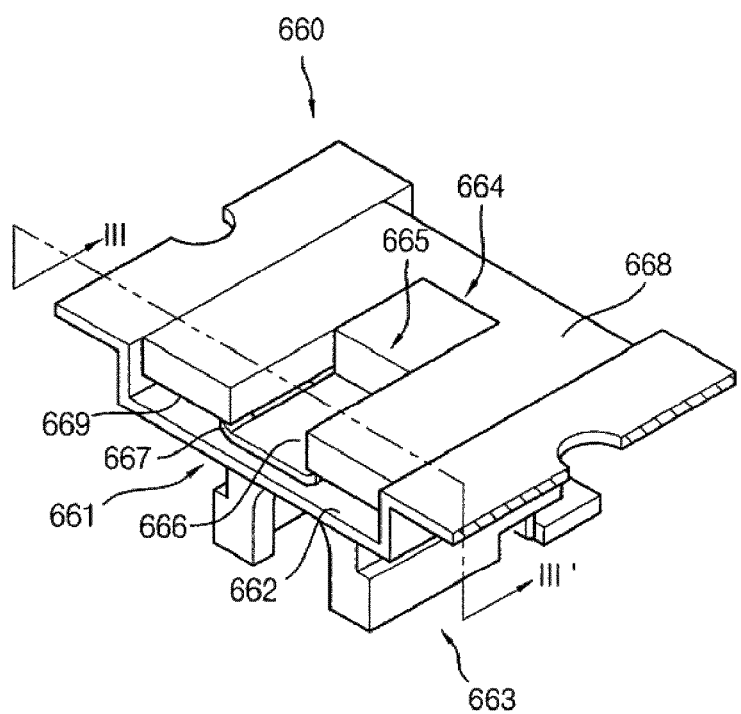
FIG. 19 is a perspective view illustrating a second lamp fixing unit according to a third exemplary embodiment of the present invention.
Figure 20:
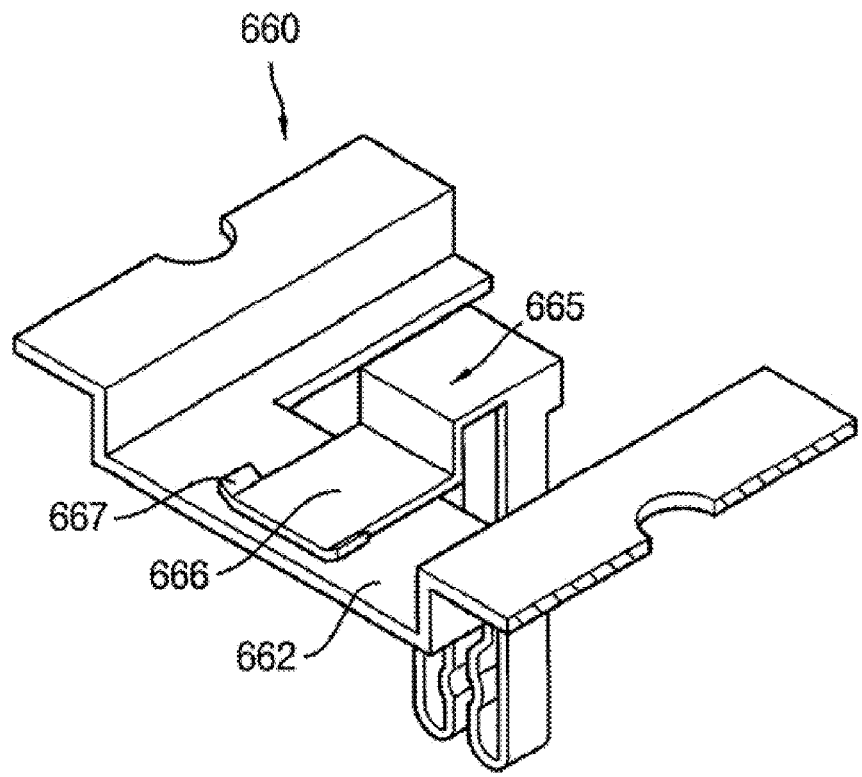
FIG. 20 is a perspective view illustrating an array plate and a conductive socket of the second lamp fixing unit illustrated in FIG. 19.
Figure 21:
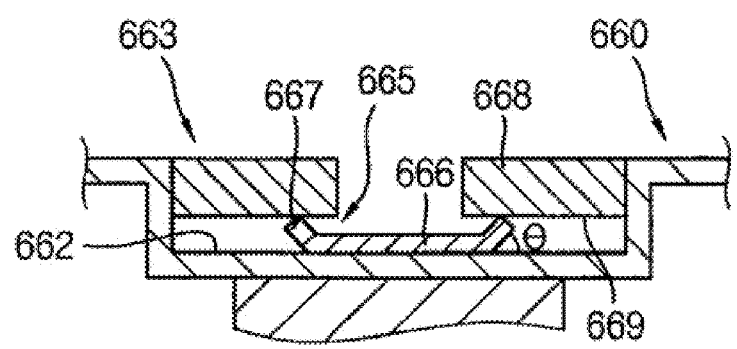
FIG. 21 is a cross-sectional view taken along the line III-III' in FIG. 19.

FIG. 19 is a perspective view illustrating a second lamp fixing unit according to a third exemplary embodiment of the present invention. FIG. 20 is a perspective view illustrating an array plate and a conductive socket of the second lamp fixing unit illustrated in FIG. 19. FIG. 21 is a cross-sectional view taken along the line III-III' in FIG. 19.

Referring to FIGS. 19 to 21, a second connection portion 665, included in a second conductive socket 664 of a second lamp holder 663, includes a coupling terminal 666 having a protruding portion 667 that protrudes in a direction opposite to a holder fixing portion 661 of an array plate 660.

The protruding portion 667 is pressed on by a body coupling portion 668, and at least two protruding portions 667 may be formed. The protruding portion 667 is pressed on by a pressure-applying surface 669 of the body coupling portion 668. The pressure-applying surface 669 is adjacent to a lower surface 662 of the holder fixing portion 661. Particularly, the protruding portion 667 of the coupling terminal 666 is disposed between the pressure-applying surface 669 and the lower surface 662 of the holder fixing portion 661 and pressed on by the pressure-applying surface 669, and thus the coupling terminal 666 may make contact with the lower surface 662 of the holder fixing portion 661.

The protruding portion 667 protrudes at an angle θ (see FIG. 21) smaller than or equal to about 70 degrees with respect to the holder fixing portion 661. Thus, when the body coupling portion 668 and the coupling terminal 666 are inserted into the holder fixing portion 661, pressure may be generated in a direction substantially normal to the lower surface 662 of the holder fixing portion 661 to easily couple the coupling terminal 666 and the holder fixing portion 661 to each other.

The protruding portion 667 is formed on two end portions of the coupling terminal 666. Alternatively, the protruding portion 667 may be formed on substantially all of two sides of the coupling terminal 666. The angle θ of the protruding portion 667 may decrease with the length of the coupling terminal 666, so that the angle θ with respect to the holder fixing portion 661 at one end portion of the coupling terminal 666 may be smaller than at other points along the length of the coupling terminal 666. Thus, when the body coupling portion 668 and the coupling terminal 666 are inserted to the holder fixing portion 661, initial insertion may be easily performed.

As described above, the coupling terminal 666 of the second connection portion 665 makes surface contact with the holder fixing portion 661 through the protruding portion 667. A large area of the second connection portion 665 may contact the array plate 660, thereby reducing the electrical resistance between the coupling terminal 666 and the holder fixing portion 661. Therefore, the second connection portion 665 and the array plate 660 are stably electrically connected to each other.

Figure 22:
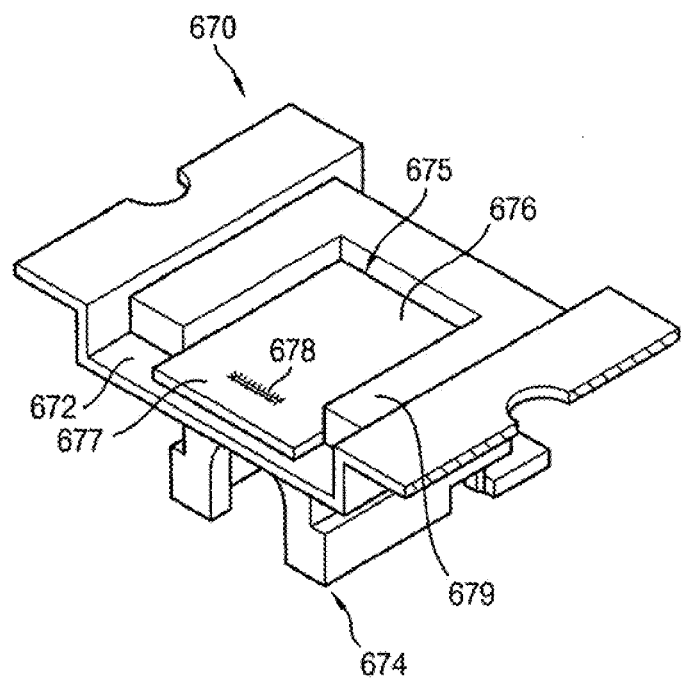
FIG. 22 is a perspective view illustrating a second lamp fixing unit according to a fourth exemplary embodiment of the present invention.

FIG. 22 is a perspective view illustrating a second lamp fixing unit according to a fourth exemplary embodiment of the present invention.

Referring to FIG. 22, a second connection portion 676 of a second conductive socket 675 of a second lamp holder 674 includes a coupling terminal 677 that extends beyond one end of a body coupling portion 679.

The coupling terminal 677 includes a pressure-applying portion 678 pressed onto a holder fixing portion 672. The coupling terminal 677 is coupled to the holder fixing portion 672 through the pressure-applying portion 678. The pressure-applying portion 678 is formed on the coupling terminal 677 and the holder fixing portion 672 by using a compressing tool or a punching tool. Thus, the pressure-applying portion 678 has, for example, a shape recessed by a predetermined depth. Pressure marks (not shown) may be formed on the holder fixing portion 672 corresponding to the pressure-applying portion 678.

The pressure-applying portion 678 prevents various undesirable occurrences such as a bad electrical connection between the coupling terminal 677 and the holder fixing portion 672, which may be caused by an external impact, or a movement of the second lamp holder 674 and the holder fixing portion 672, among others.

The pressure-applying portion 678 has a predetermined length and extends along the longest direction of the array plate 670. Depending on the embodiment, the pressure-applying portion 678 may have any shape as determined by the particular compressing tool or punching tool that is used. Although one pressure-applying portion 678 is formed in FIG. 22, more than one pressure-applying portion 678 may be formed as appropriate for the desired characteristics and size of a product.

Figure 23:
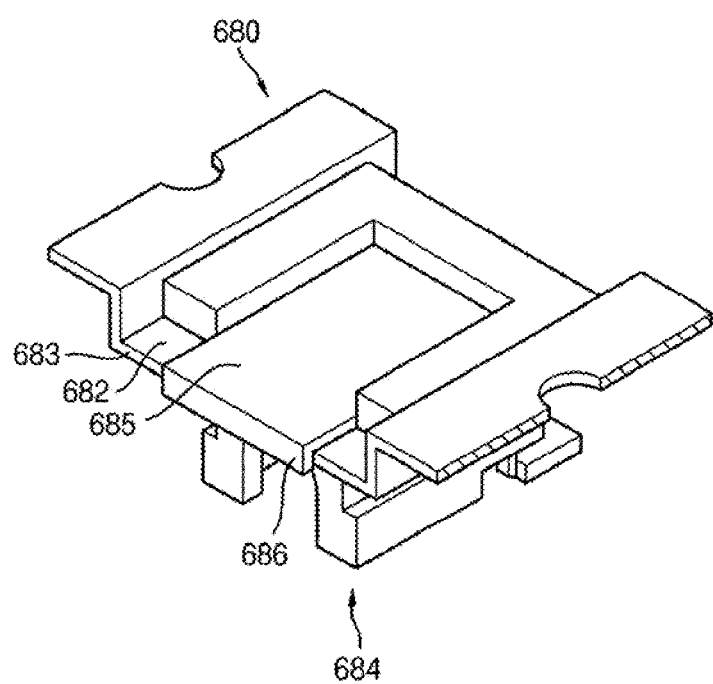
FIG. 23 is a perspective view illustrating a second lamp fixing unit according to a fifth exemplary embodiment of the present invention.

FIG. 23 is a perspective view illustrating a second lamp fixing unit according to a fifth exemplary embodiment of the present invention.

Referring to FIG. 23, a second lamp holder 684 includes a coupling terminal 685 having an extension portion 686 that extends along a side surface 683 of a holder fixing portion 682 of an array plate 680.

The extension portion 686 extends from an end of the coupling terminal 685 to be coupled to the side surface 683 of the holder fixing portion 682. Thus, when the second lamp holder 684 is inserted into and fixed to the holder fixing portion 682 of the array plate 680, the coupling terminal 685 may extend to the side surface 683 of the holder fixing portion 682.

When the coupling terminal 685 does not reach the side surface 683 of the holder fixing portion 682, the extension portion 686 may not be coupled to the side surface 683 of the holder fixing portion 682. In this case, the electrical connection between the coupling terminal 685 and the holder fixing portion 682 is less than ideal. Although the coupling terminal 685 may be coupled to the holder fixing portion 682 instead of the extension portion 686, this configuration has its disadvantages in that a short may be generated by an external impact or during the assembly of the second lamp holder 684 and the array plate 680, compromising the reliability of an electrical connection.

Since the extension portion 686 prevents the second lamp holder 684 and the holder fixing portion 682 from becoming uncoupled, the extension portion 686 improves the assemblability of the second lamp holder 684 and the array plate 680.

Figure 24:
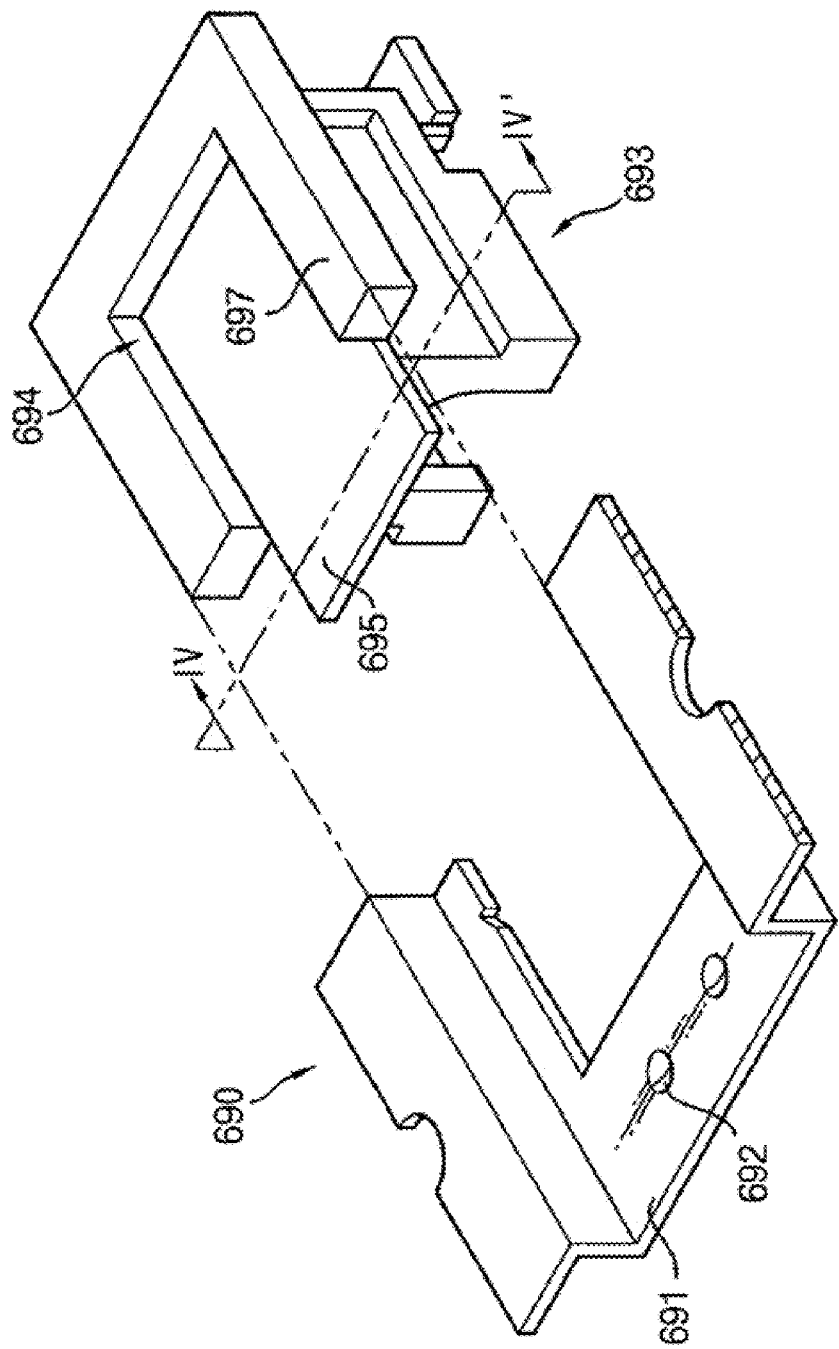
FIG. 24 is an exploded perspective view illustrating a second lamp fixing unit according to a sixth exemplary embodiment of the present invention.
Figure 25:
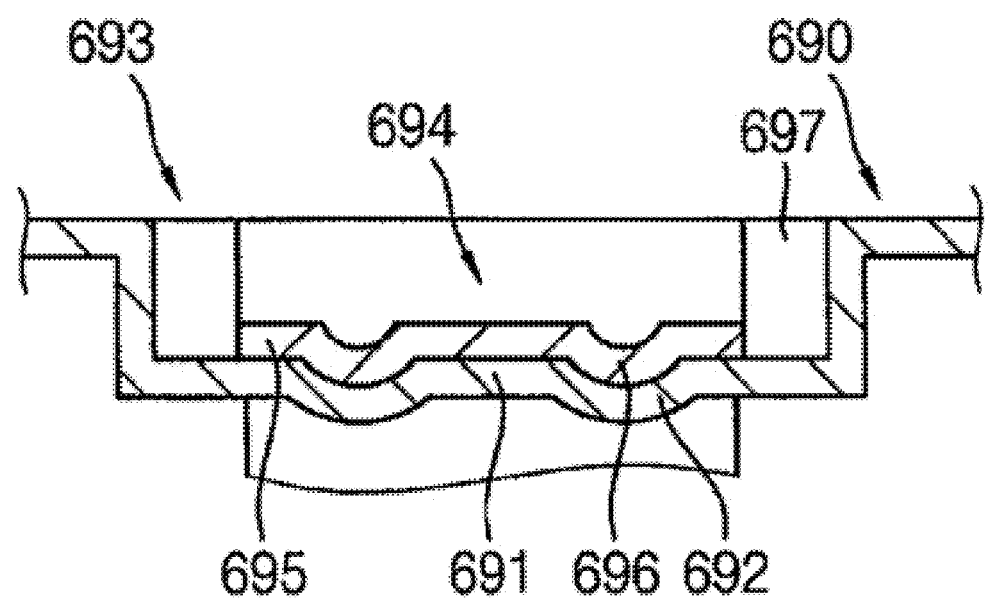
FIG. 25 is a cross-sectional view taken along the line IV-IV' in FIG. 24.

FIG. 24 is an exploded perspective view illustrating a second lamp fixing unit according to a sixth exemplary embodiment of the present invention. FIG. 25 is a cross-sectional view taken along the line IV-IV' in FIG. 24.

Referring to FIGS. 24 and 25, a second connection portion 694 of a second lamp holder 693 includes a coupling terminal 695 having a protruding portion 696 that protrudes to a holder fixing portion 691 of an array plate 690.

The protruding portion 696 is formed on the coupling terminal 695 that extends beyond a body coupling portion 697. Alternatively, the protruding portion 696 may be formed on various areas in which the coupling terminal 695 makes contact with the holder fixing portion 691.

The holder fixing portion 691 includes a recessed terminal 692 that is positioned to fit with the protruding portion 696 upon assembly. Thus, protruding portion 696 is coupled to the recess terminal 692, electrically connecting the coupling terminal 695 to the holder fixing portion 691.

The protruding portion 696 and the recessed terminal 692 may have a rounded that facilitates the coupling to each other. However, the invention is not limited to any particular shape of the protruding portion 696 and the recessed terminal 692, which may have various shapes according to the desired characteristics of a product. Although two protruding portions 696 and two recessed terminals 692 are formed in FIGS. 24 and 25, more than two protruding portions 696 and more than two recess terminals 692 may be formed to improve the coupling force between the coupling terminal 695 and the holder fixing portion 691.

As described above, the protruding portion 696 may be formed in various shapes and numbers, and the recessed terminal 692 may be positioned on the holder fixing portion 691 to fit with the protruding portion 696. Thus, the coupling terminal 695 may couple the coupling terminal 695 to the holder fixing portion 691.

Figure 26:
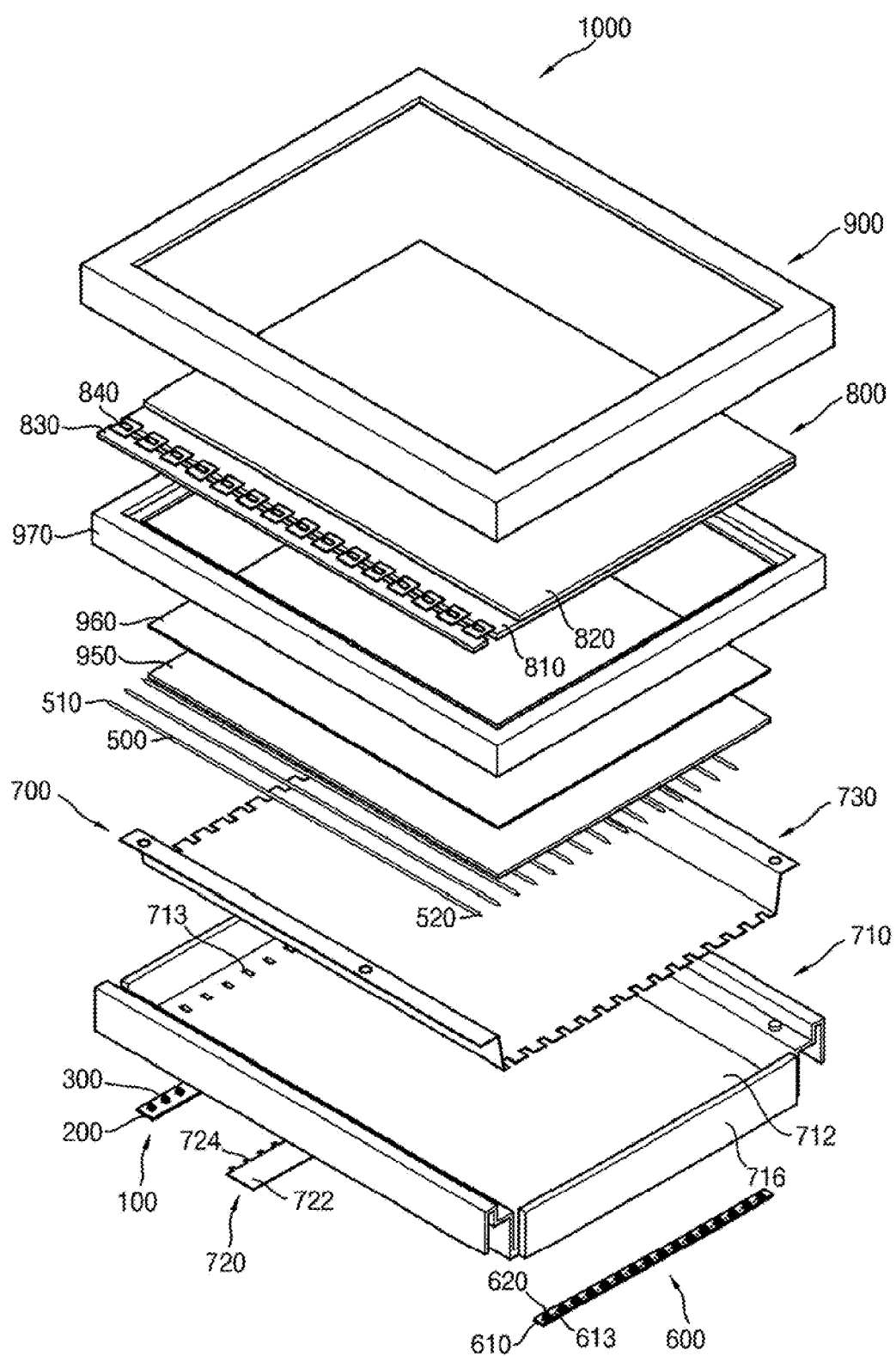
FIG. 26 is an exploded perspective view illustrating a liquid crystal display device according to an exemplary embodiment of the present invention.

FIG. 26 is an exploded perspective view illustrating a liquid crystal display device according to an exemplary embodiment of the present invention.

In FIG. 26, the backlight assembly is substantially the same as the backlight assembly illustrated in FIGS. 10 through 25. Thus, substantially the same parts are represented by the same reference numerals, and any redundant description concerning the same parts will be omitted.

Referring to FIG. 26, a liquid crystal display (LCD) device 1000 according to an exemplary embodiment of the present invention includes a backlight assembly 700, an LCD panel 800 and a top chassis 900.

The LCD panel 800 includes an array substrate 810, a color filter substrate 820, and a liquid crystal layer (not shown) interposed between the array substrate 810 and the color filter substrate 820.

The array substrate 810 includes a thin film transistor (TFT) substrate having TFTs that are arranged in a matrix shape and serve as a switching element. The color filter substrate 820 includes red, green and blue (RGB) pixels in a thin film form.

The LCD panel 800 may further include a printed circuit board (PCB) 830 controlling a gate voltage and a data voltage and a printed circuit film connecting the PCB 830 and the array substrate 810 to each other.

The top chassis 900 fixes the edge portions of the LCD panel 800 and is coupled to a receiving container 710. The top chassis 900 includes, for example, the same metal as the receiving container 200.

The top chassis 900 may be electrically connected to the array plate 610. Thus, a grounded area of the ground lead 520 may extend to the receiving container 710 and the top chassis 900, and a driving voltage applied to the power source lead 510 may be constantly maintained.

The LCD device 1000 may further include a light-diffusing plate 950 that diffuses the light generated from the lamps 500, an optical sheet 960 that improves optical characteristics exiting the light-diffusing plate 950 and a middle mold 970 that fixes the edge portions of the optical sheet 960 and supports the edge portions of the LCD panel 800.

According to the lamp fixing unit, the backlight assembly and the LCD device of the present invention, the power supply terminals of the power supply member are inserted into the insertion space through the first openings and the second openings, and coupled and fixed to the first connection portion of the conductive socket of the lamp holder. This configuration allows the first lamp holders and the power supply member to be easily coupled to and uncoupled from each other.

Also, the ground lead is electrically connected to the array plate that is coupled to the receiving container, through the second conductive socket of the second lamp holder, thereby connecting the ground leads to the receiving container (which contains metal).

Although exemplary embodiments of the present invention have been described, it is understood that the present invention is not be limited to these exemplary embodiments and various changes and modifications can be made by one ordinary skilled in the art within the spirit and scope of the present invention as hereinafter claimed.

What is claimed is:

1. A lamp fixing unit comprising:
  a fixing member comprising a fixing body and at least one receiving portion protruding from the fixing body in a first direction, a first opening being formed at a side of the receiving portion; and
  a lamp holder comprising:
    a holder body comprising:
      a board insertion portion that is received in the receiving portion and has a second opening, an externally provided power supply member being inserted through the first opening of the receiving portion and the second opening, and
      a lamp fixing member that protrudes in a second direction from the fixing body and fixes a lamp, the second direction being opposite to the first direction; and
    a conductive socket disposed in the holder body to electrically connect the power supply member and the lamp to each other, the conductive socket having a first terminal making contact with an upper surface of a power supply terminal of the power supply member and a second terminal making contact with a lower surface of the power supply terminal.

2. The lamp fixing unit of claim 1, wherein the at least one receiving portion includes a plurality of receiving portions and the plurality of receiving portions are spaced apart from each other by a substantially regular interval along a longest direction of the fixing member.

3. The lamp fixing unit of claim 2, wherein the conductive socket comprises:
  a first connection portion disposed in the board insertion portion and electrically connected to the power supply terminal of the power supply member; and
  a second connection portion protruding from the first connection portion and being disposed in the lamp fixing portion, the second connection portion being electrically connected to a lead of the lamp.

4. The lamp fixing unit of claim 3, wherein the first terminal and the second terminal are part of the first connection portion and the first connection portion further comprises:
  a third terminal electrically connecting the first and second terminals and extending toward the second connection portion.

5. The lamp fixing unit of claim 4, wherein the first terminal is substantially parallel to the power supply terminal, and the second terminal is bent to exert a force toward the first terminal.

6. The lamp fixing unit of claim 4, wherein at least one of the first and second terminals has a curved portion capable of applying an elastic force on the power supply terminal.

7. The lamp fixing unit of claim 4, wherein the first and second terminals are bent to form rounded portions near the second opening, wherein the rounded portions are capable of applying a force on the power supply terminal to hold the power supply terminal in place.

* * * * *